United States Patent
Li et al.

(10) Patent No.: US 10,341,478 B2
(45) Date of Patent: Jul. 2, 2019

(54) HANDHELD WRITING IMPLEMENT FORM FACTOR MOBILE DEVICE

(71) Applicant: Essential Products, Inc., Palo Alto, CA (US)

(72) Inventors: Siqi Li, Menlo Park, CA (US); David John Evans, V, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/716,276

(22) Filed: Sep. 26, 2017

(65) Prior Publication Data
US 2019/0007537 A1    Jan. 3, 2019

Related U.S. Application Data

(63) Continuation of application No. 15/707,813, filed on Sep. 18, 2017.

(60) Provisional application No. 62/528,357, filed on Jul. 3, 2017, provisional application No. 62/553,077, filed on Aug. 31, 2017.

(51) Int. Cl.
| | |
|---|---|
| *H04B 1/3888* | (2015.01) |
| *H04M 1/04* | (2006.01) |
| *H04M 1/02* | (2006.01) |
| *G06F 3/01* | (2006.01) |
| *H04M 1/725* | (2006.01) |

(52) U.S. Cl.
CPC .......... *H04M 1/0285* (2013.01); *G06F 3/017* (2013.01); *H04M 1/0266* (2013.01); *H04M 1/7253* (2013.01); *H04M 2001/0204* (2013.01); *H04M 2250/22* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 5,063,508 A | 11/1991 | Yamada et al. | |
| 6,181,329 B1 | 1/2001 | Stork | |

(Continued)

OTHER PUBLICATIONS

Final Office Action dated Jun. 14, 2018 for U.S. Appl. No. 15/707,813 of Li et al.

(Continued)

*Primary Examiner* — Cindy Trandai
(74) *Attorney, Agent, or Firm* — Perkins Coie LLP

(57) ABSTRACT

Presented here is a handheld writing implement form factor for a mobile device. The shape of the device can correspond to the shape of a whiteboard marker. Due to the small size, the device does not have a physical keyboard or an onscreen keyboard and instead relies on environmental cues, gestural input, voice input, and touch input to interpret user instructions. For example, when the device determines from environmental cues that it is resting on a tabletop, a touch input consisting of a single press from the user is interpreted as an instruction to scroll the display. In other embodiments, the device can be used as a handheld writing implement, such as a computer stylus, or to control the device by handwriting in the air. Other uses of the device are disclosed such as making a payment, communicating with other appliances enabled for electronic communication, recording images with a gesture, etc.

13 Claims, 31 Drawing Sheets

(56) References Cited

U.S. PATENT DOCUMENTS

| | | | |
|---|---|---|---|
| 6,208,435 B1 | 3/2001 | Zwolinski | |
| 6,310,988 B1 * | 10/2001 | Flores | G06K 7/14 |
| | | | 382/189 |
| 6,573,887 B1 | 6/2003 | O'Donnell, Jr. et al. | |
| 6,917,722 B1 * | 7/2005 | Bloomfield | G06F 3/00 |
| | | | 382/313 |
| 6,972,749 B2 | 12/2005 | Hinckley et al. | |
| 8,267,368 B2 | 9/2012 | Torii et al. | |
| 8,600,196 B2 * | 12/2013 | King | G06Q 30/00 |
| | | | 358/474 |
| D718,720 S | 12/2014 | Rader et al. | |
| RE45,559 E * | 6/2015 | Williams | G06F 3/03545 |
| 9,354,709 B1 * | 5/2016 | Heller | G06F 3/017 |
| RE46,548 E | 9/2017 | Williams et al. | |
| 9,813,693 B1 * | 11/2017 | Baldwin | H04N 13/0271 |
| 2007/0211573 A1 * | 9/2007 | Hermansson | H04M 1/274516 |
| | | | 367/99 |
| 2008/0117168 A1 * | 5/2008 | Liu | G06F 1/1616 |
| | | | 345/158 |
| 2010/0231687 A1 | 9/2010 | Amory et al. | |
| 2010/0321471 A1 | 12/2010 | Casolara et al. | |
| 2012/0029417 A1 * | 2/2012 | Samain | A61K 8/49 |
| | | | 604/20 |
| 2012/0033091 A1 * | 2/2012 | Miyasako | H04N 5/23254 |
| | | | 348/208.1 |
| 2012/0094773 A1 * | 4/2012 | Suzuki | A63F 43/655 |
| | | | 463/43 |
| 2013/0045774 A1 * | 2/2013 | Arat | G06F 1/1694 |
| | | | 455/556.1 |
| 2013/0278790 A1 * | 10/2013 | Oh | H04N 5/202 |
| | | | 348/223.1 |
| 2014/0313127 A1 * | 10/2014 | Deng | G06F 3/0487 |
| | | | 345/156 |
| 2014/0334736 A1 * | 11/2014 | Niu | G06K 9/4642 |
| | | | 382/195 |
| 2015/0009187 A1 * | 1/2015 | Mercea | G06F 3/03545 |
| | | | 345/179 |
| 2015/0067580 A1 * | 3/2015 | Um | G06F 3/048 |
| | | | 715/781 |
| 2015/0261310 A1 * | 9/2015 | Walmsley | G06F 1/1626 |
| | | | 345/173 |
| 2015/0309582 A1 * | 10/2015 | Gupta | G06F 3/011 |
| | | | 345/156 |
| 2016/0054971 A1 * | 2/2016 | Yu | H04N 7/15 |
| | | | 345/2.1 |
| 2016/0191891 A1 | 6/2016 | Gilpin | |
| 2016/0346494 A1 | 12/2016 | Harrison et al. | |
| 2017/0054904 A1 | 2/2017 | Li et al. | |
| 2017/0078653 A1 | 3/2017 | Bi et al. | |
| 2017/0091153 A1 * | 3/2017 | Thimbleby | G06F 17/212 |
| 2017/0242471 A1 * | 8/2017 | Ma | G06F 3/013 |
| 2017/0278262 A1 * | 9/2017 | Kawamoto | G06T 7/70 |
| 2017/0316487 A1 | 11/2017 | Mazed | |
| 2017/0318126 A1 | 11/2017 | Breitenfeld et al. | |
| 2017/0330332 A1 | 11/2017 | Choi et al. | |
| 2017/0339392 A1 | 11/2017 | Forutanpour et al. | |

OTHER PUBLICATIONS

Non-Final Office Action dated Dec. 1, 2017 for U.S. Appl. No. 15/707,813 of Li et al.

* cited by examiner

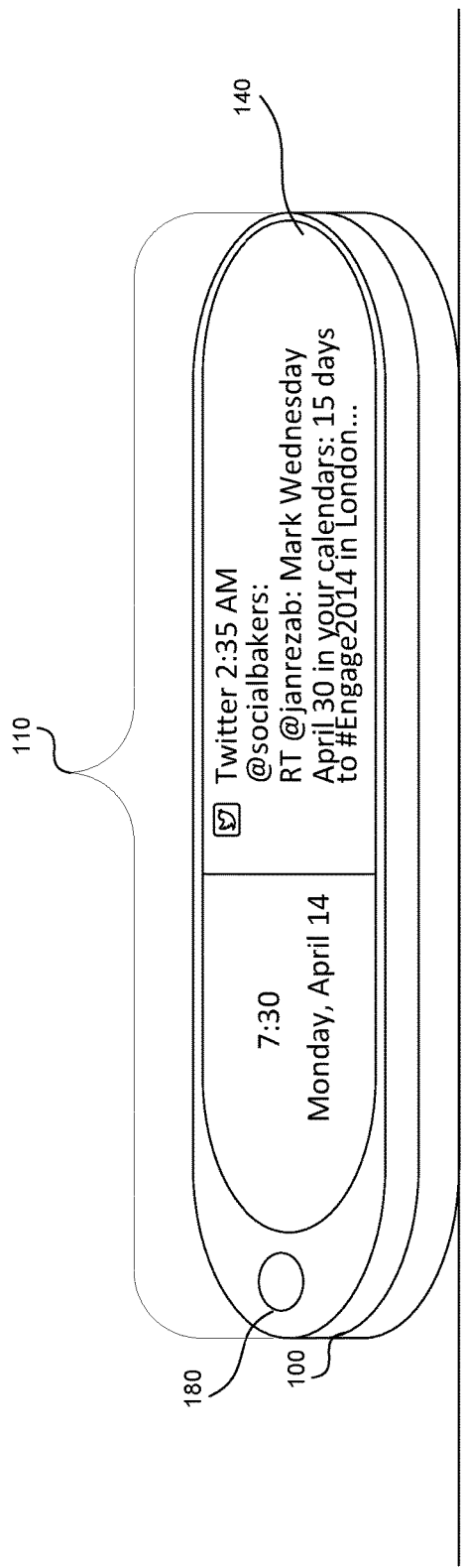
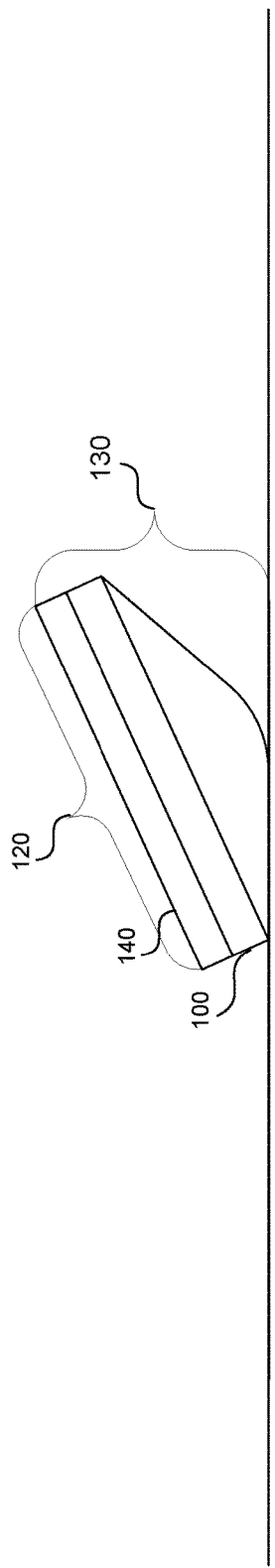
Fig. 1A
Fig. 1B

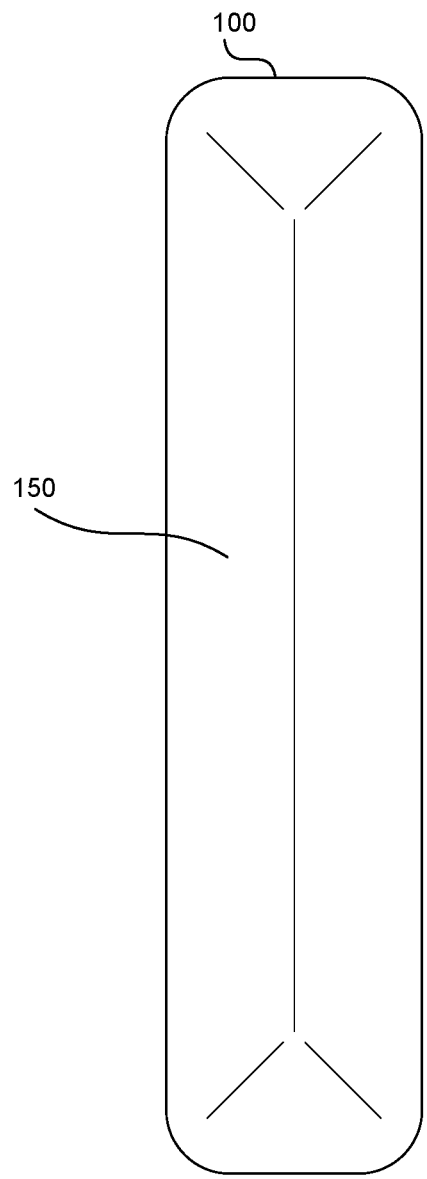
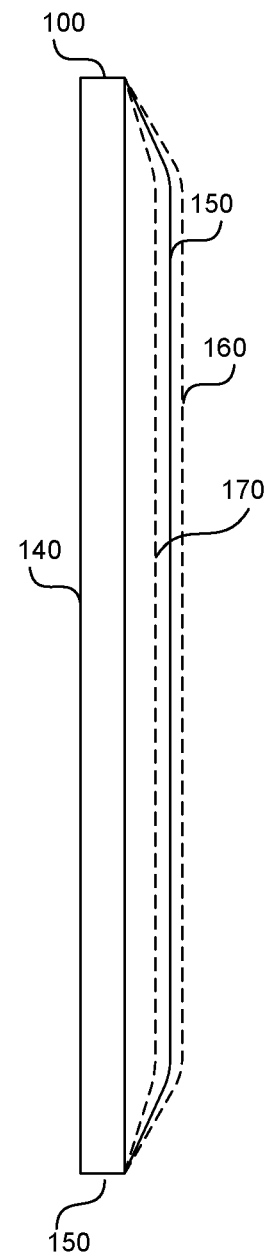
Fig. 1C
Fig. 1D

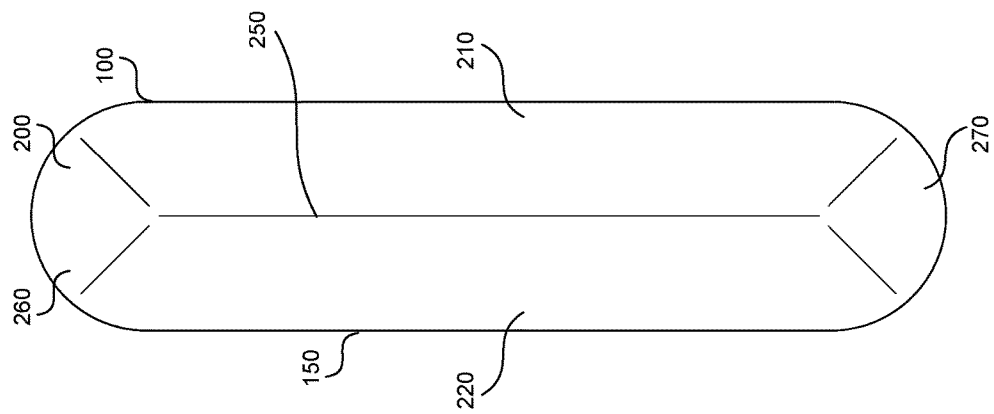
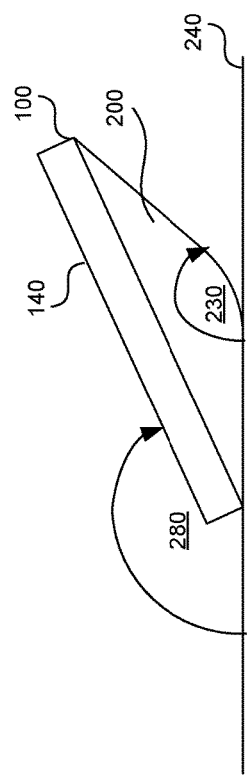
Fig. 2B
Fig. 2A

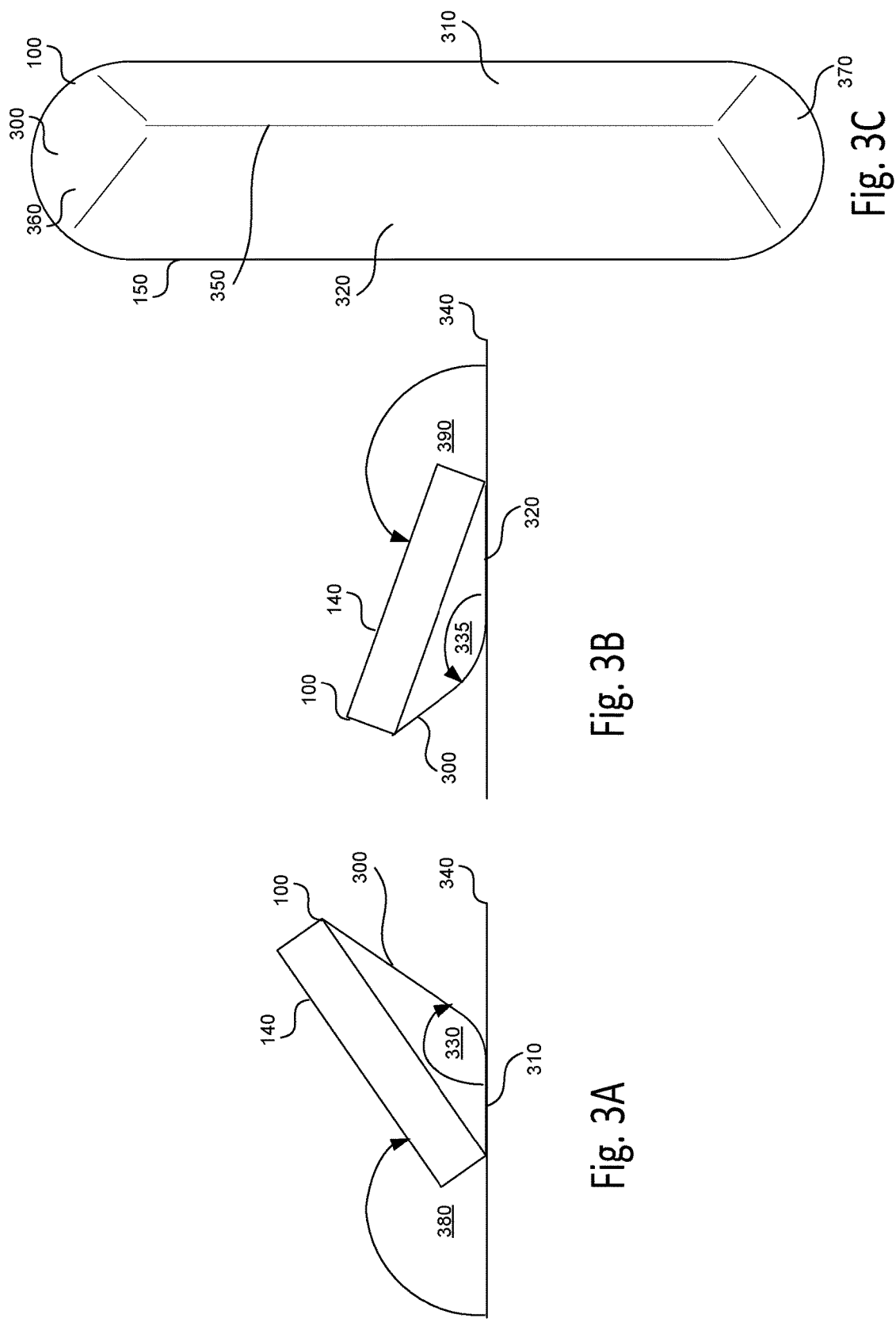

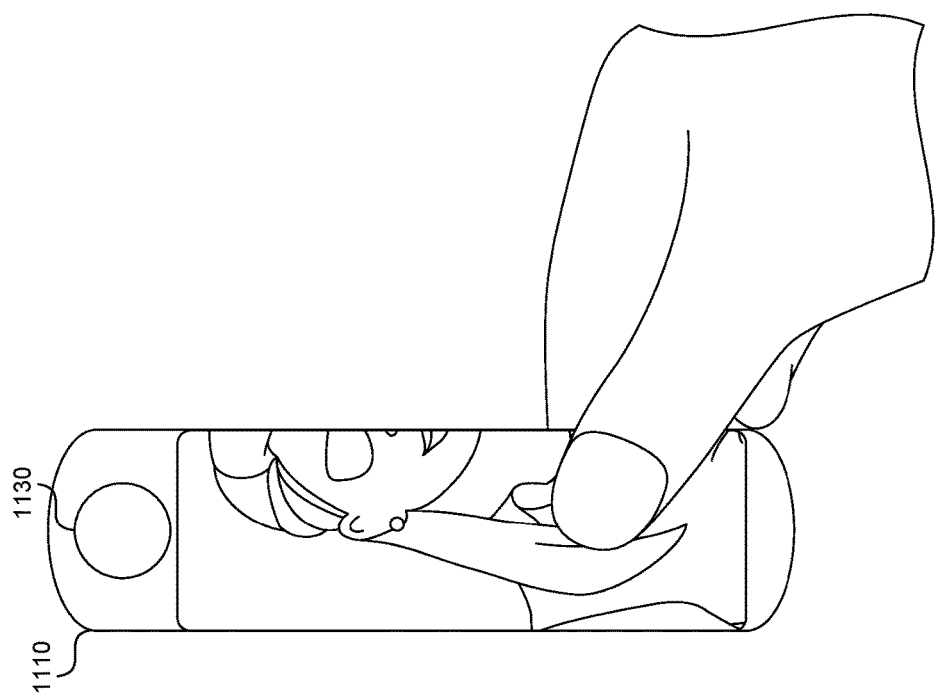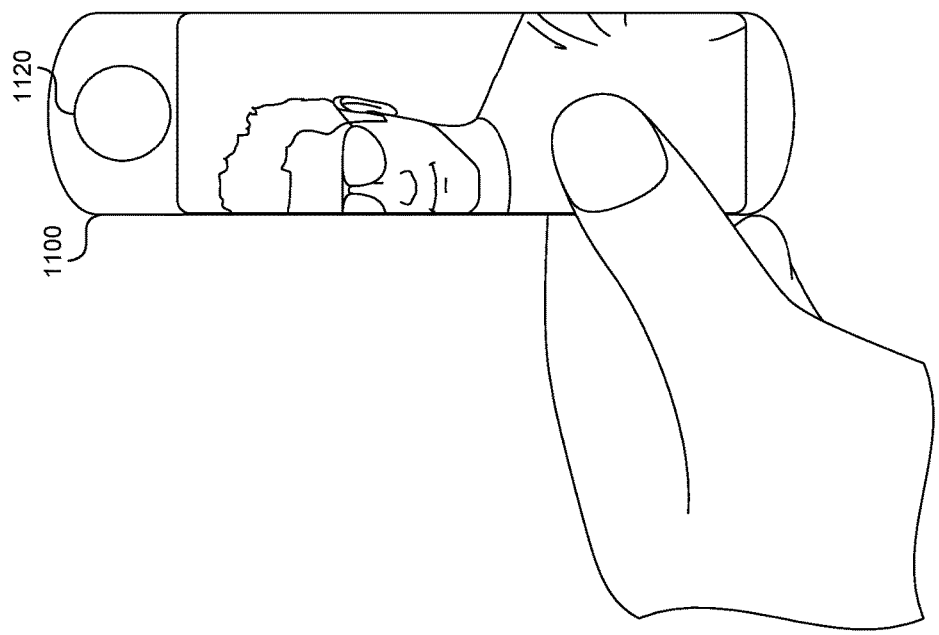
Fig. 11

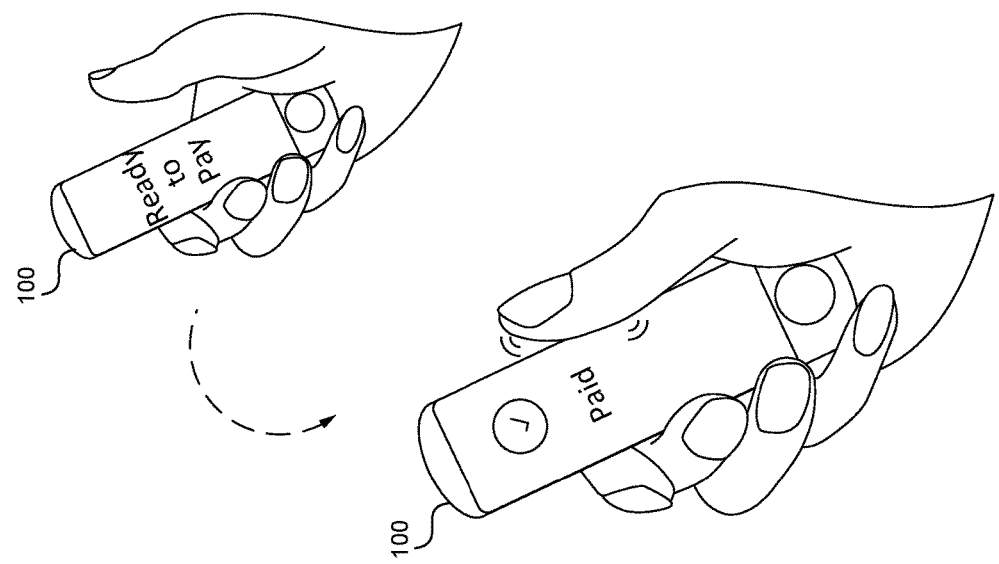
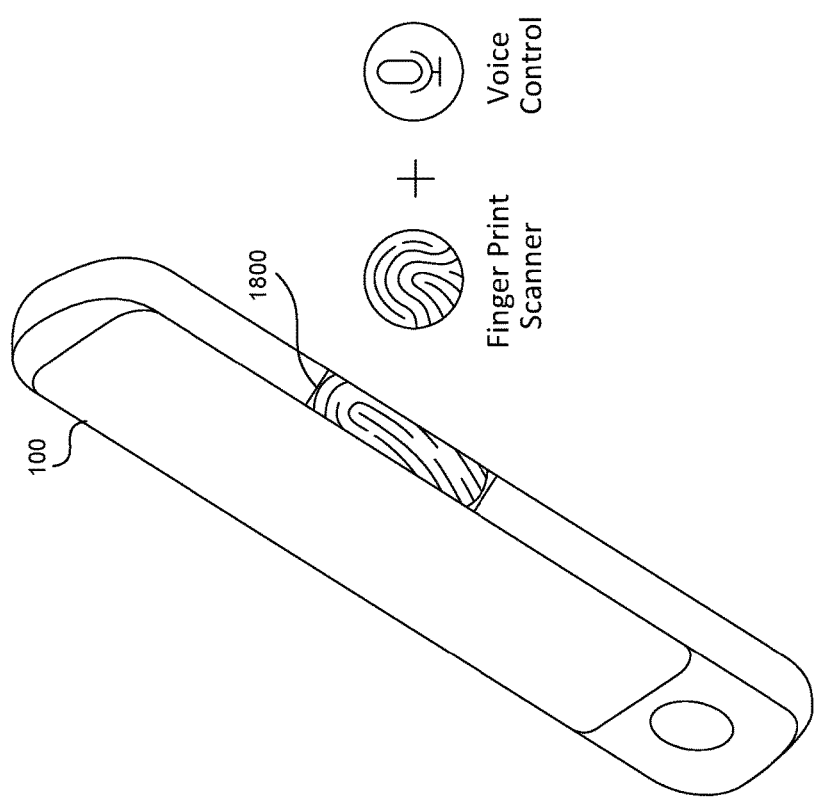
Fig. 18B
Fig. 18A

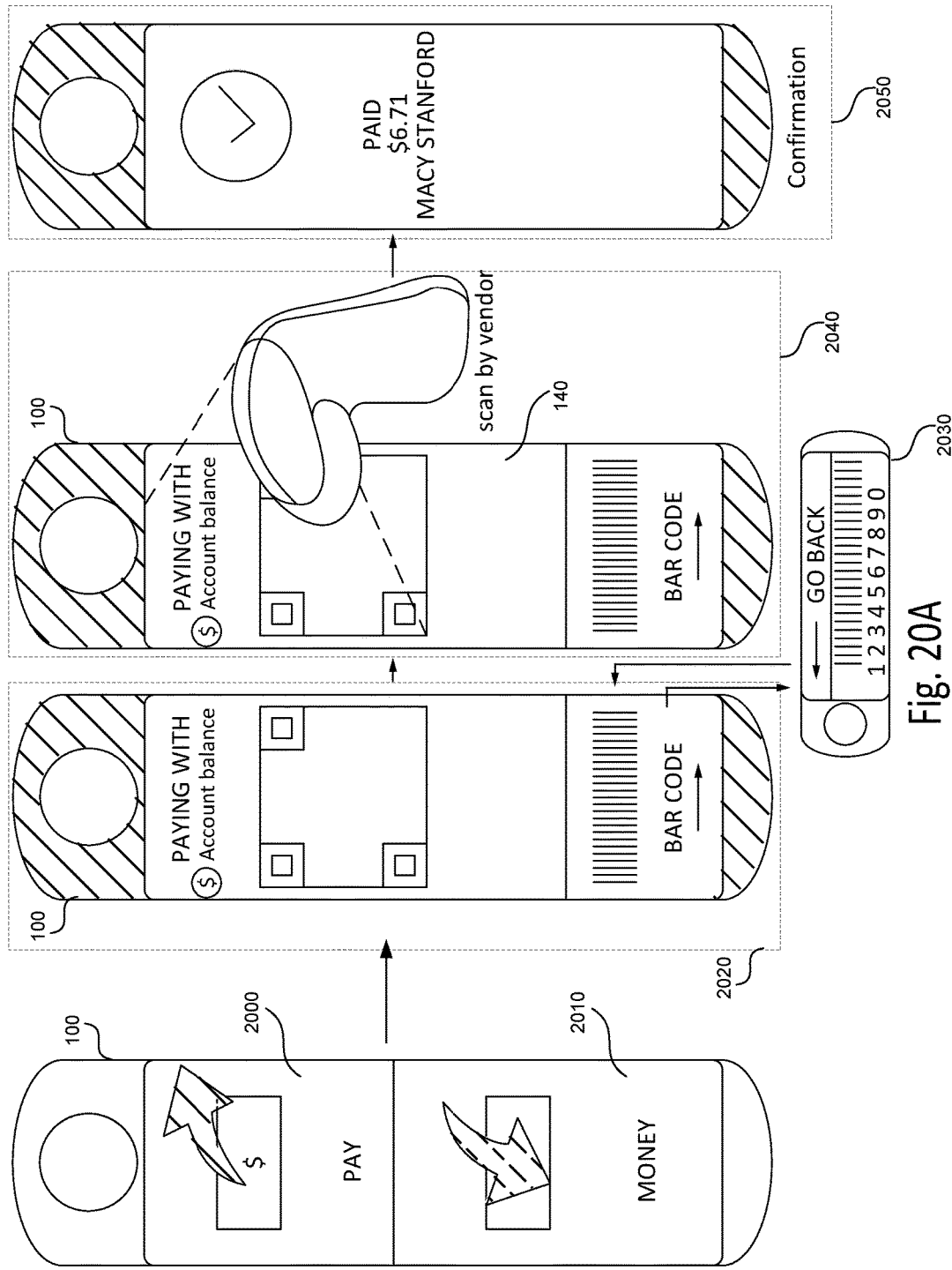

HANDHELD WRITING IMPLEMENT FORM FACTOR MOBILE DEVICE

CROSS-REFERENCE TO RELATED APPLICATIONS

This application is a continuation of U.S. utility application Ser. No. 15/707,813, filed Sep. 18, 2017, which claims priority to the U.S. provisional patent application Ser. No. 62/528,357, filed Jul. 3, 2017; and to the U.S. provisional patent application Ser. No. 62/553,077, filed Aug. 31, 2017, all of which are incorporated herein in their entirety and by this reference thereto.

TECHNICAL FIELD

The present application is related to mobile devices and, more specifically, to methods and systems used to operate a mobile device having a handheld writing implement form factor.

BACKGROUND

The form factor of a mobile phone is its size, shape, and style, as well as the layout and position of its major components. There are three major form factors—bar phones, flip phones, and sliders—as well as sub-categories of these forms and some atypical forms. The most common form factor in mobile phones today is a slate or touchscreen phone which is a subset of the bar form. The bar form, like a tablet computer, has few physical buttons, instead relying upon a touchscreen and an onscreen keyboard. Since the mid-2010s, almost all smartphones come in a "touchscreen" slate form.

SUMMARY

Presented here is a handheld writing implement form factor for a mobile device such as a mobile phone. The shape of the mobile device can roughly correspond to the shape of a whiteboard marker. Due to the small size, the mobile device does not necessarily have a physical keyboard or an onscreen keyboard, and instead relies on environmental cues, gestural input, voice input, and touch input to interpret user instructions. Environmental cues can include presence of other devices enabled for electronic communication, ambient light, ambient sound, etc. For example, when the mobile device determines from environmental cues that it is resting on a tabletop, a touch input consisting of a single press from the user is interpreted as an instruction to scroll the display. In other examples, the mobile device can be used as a handheld writing implement, such as a computer stylus, or to control the mobile device by handwriting in the air. Other uses of the handheld writing implement form factor phone are disclosed such as making a payment, communicating with other appliances enabled for electronic communication, recording images with a gesture, etc.

BRIEF DESCRIPTION OF THE DRAWINGS

FIGS. 1A-1B show a handheld device having a handheld writing implement form factor, from the front, and a side, respectively.

FIG. 1C-1D shows a handheld device from the back, and a side, respectively.

FIGS. 2A-2B show a side view and a back view of a support member of a handheld device, according to one embodiment.

FIGS. 3A-3C show side views and a back view of a support member of a handheld device, according to another embodiment.

FIG. 11 shows the use of a gestural input and an environment cue to record a group picture with multiple handheld devices.

FIGS. 18A-18B show payment authorization using a handheld device.

FIG. 20A shows the use of a handheld device in payment by scanning.

DETAILED DESCRIPTION

Figure 4A:
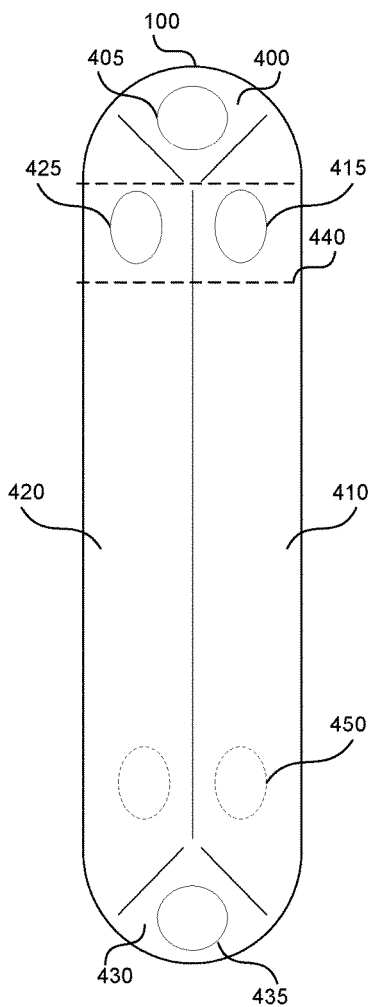
FIGS. 4A-4C show multiple cameras placed around the perimeter of a handheld device, according to various embodiments.

Handheld Writing Implement Form Factor Mobile Device

Presented here is a handheld writing implement form factor for a mobile device such as a mobile phone. The shape of the mobile device can roughly correspond to the shape of a whiteboard marker. Due to the small size, the mobile device does not necessarily have a physical keyboard or an onscreen keyboard and instead relies on environmental cues, gestural input, voice input, and touch input to interpret user instructions. Environmental cues can include presence of other devices enabled for electronic communication, ambient light, ambient sound, etc. For example, when the mobile device determines from environmental cues that it is resting on a tabletop, a touch input consisting of a single press from the user is interpreted as an instruction to scroll the display. In other examples, the mobile device can be used as a handheld writing implement, such as a computer stylus, or to control the mobile device by handwriting on a non-electronic surface, such as air, paper, desk, etc. Other uses of the handheld writing implement form factor phone are disclosed such as making a payment, communicating with other appliances enabled for electronic communication, recording images with a gesture, etc.

FIGS. 1A-1B show a handheld device having a handheld writing implement form factor, from the front, and a side, respectively. The handheld device ("device") 100 can be an electronic device such as a mobile phone. The device 100 can perform all the functions of a mobile phone, such as making a call, sending and receiving text messages, providing driving directions, etc.

The size of the device is designed to fit a user's hand, fit inside the user's pocket, etc. The size of the device is substantially the same as the size of a handheld writing implement, such as a whiteboard marker. The handheld writing implement includes various pens, pencils, crayons, markers, highlighters, etc., and excludes typewriters and keyboards. The device can take on the shape similar to a whiteboard marker, an elongated prism, a wand, a stick, etc. The device has a length, a width, and a height. The length 110 is substantially larger than the width 120 and the height 130. The width 120 is substantially similar to the height 130. For example, the length 110 can be at least 2.5 times as long as the width 120 and height 130, and the width 120 can be at most two times as long as the height 130. Also, the width 120 can be at most 0.5 times as long as the height 130. In one embodiment, the length 110, the width 120 and the height 130 can be measured by defining a bounding box surrounding the device 100 and measuring the length of the bounding box in the three dimensions. In this embodiment, the length 110 is the same as the length of the bounding box, the width 120 is the same as the width of the bounding box, and the height 130 is the same as the height of the bounding box.

The handheld device 100 contains a display 140 and a camera 180. The display 140 has a shape including the length 110. The camera 180 can be placed on the same side of the handheld device 100 as the display 140. Given the small size of the device, the device 100 can be without a physical keyboard or onscreen keyboard. Instead, the device 100 can receive user input through voice commands, gestures, touch, environmental cues, etc.

FIGS. 1C-1D show a handheld device from the back, and a side, respectively. The handheld device 100 includes a non-display surface 150. The non-display surface 150 and the display form a chassis of the handheld device 100. The non-display surface 150 can be made out of various materials, including optically opaque materials such as plastic or metal, optically transparent materials such as glass, or optically transparent plastic.

A touch sensor can be integrated with the non-display surface 150. The touch sensor can be a layer of touch sensors 160 placed on the outside of the non-display surface 150, or the touch sensor can be a layer of touch sensors 170 placed on the inside of the non-display surface 150. The touch sensor layer can also be integrated into the non-display surface 150. The touch sensor can receive a user input performed on the non-display surface 150. The touch sensor can be resistive, surface acoustic wave, capacitive, infrared, infrared acrylic projection, optical imaging, dispersive signal technology, acoustic pulse recognition, etc. The touch sensor can receive an input from the user such as a single press, double press, a slide, a predetermined pattern, etc. Based on the received touch, a processor associated with the device 100 can interpret the touch as an instruction to scroll the display 140. Interpretation of the touch can be dependent on an environmental cue, as described in this application.

FIGS. 2A-2B show a side view and a back view of a support member of a handheld device, according to one embodiment. The support member 200 is associated with a chassis of a handheld device 100. Support member 200 can be part of the non-display surface 150 of the device 100. When the device 100 is resting on the support member 200, the display 140 is visible to the user. The support member 200 includes multiple planar surfaces 210, 220 meeting at an angle 230. The device 100 can rest on surfaces 210, 220, 260, 270. The text and/or images contained on the display 140 of the device 100 can be oriented right side up so that the display 140 can be read by a user. For example, if the device 100 is resting on surface 210, the text and/or images contained on the display 140 will be correctly oriented, and if the device 100 is resting on the surface 220, the text and/or images contained on the display 140 will change the orientation so that the user can read the display 140.

The surfaces 210, 220 can have the same dimensions but different orientations. In other words, the two surfaces 210, 220 are symmetric about axis 250. When two surfaces 210, 220 have same dimensions, regardless of which surface 210, 220 is resting on a support surface 240, an angle 280 between the display 140 and the support surface 240 is the same.

FIGS. 3A-3C show side views and a back view of a support member of a handheld device, according to another embodiment. Like in FIGS. 2A-2B, the support member 300 is associated with a chassis of a handheld device 100. Support member 300 can be part of the non-display surface 150 of the device 100. When the device 100 is resting on the support member 300, the display 140 is visible to the user. The support member 300 includes multiple planar surfaces 310, 320, 360, 370 meeting at an angle 330, 335. The device 100 can rest on the surfaces 310, 320. The text and/or images contained on the display 140 of the device 100 can be oriented correctly, so that the text and/or images can be read by a user. For example, if the device 100 is resting on surface 310, the text and/or images contained on the display 140 will be correctly oriented, and if the device 100 is resting on the surface 320, the text and/or images contained on the display 140 will change the orientation, so that the user can read the display 140.

The surfaces 310, 320 can have different dimensions and different orientations. In other words, the two surfaces 310, 320 are asymmetric about axis 350. When two surfaces 310, 320 have different dimensions, an angle 380, 390 between the display 140 and the support surface 340 varies depending on which surface 310, 320 is resting on the support surface 340. For example, in FIG. 3A, surface 310 of the device 100 is resting on the support surface 340 while in FIG. 3B, surface 220 of the device 100 is resting on the support surface 340. The angle 380 between the display 140 and the support surface 340 in FIG. 3A is smaller than the angle 390 between the display 140 and the support surface 340 in FIG. 3B. The user can choose whether to rest the device 100 on surface 310, 320, depending on how the user prefers to view the display 140.

Figure 4B:
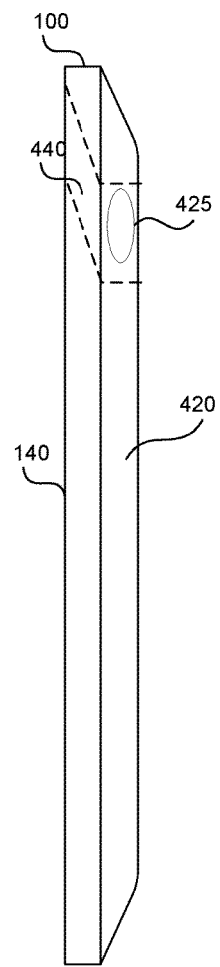
Figure 4C:
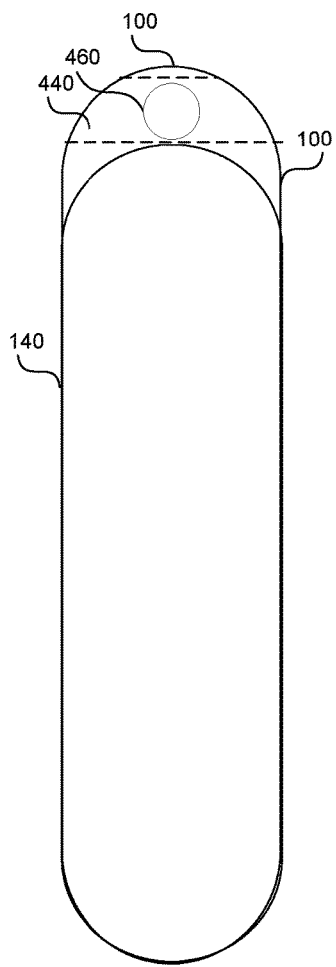

FIGS. 4A-4C show multiple cameras placed around the perimeter of a handheld device, according to various embodiments. The handheld device 100 has a non-display surface including sides 400, 410, 420, 430. The sides 400, 410, 420, 430 are substantially thicker than the four narrow sides of a standard mobile device, such as a cell phone. The thickness of the sides 400, 410, 420, 430, allows the placement of a camera lens 405, 415, 425, 435 on each of the sides 400, 410, 420, 430. A side 400, 410, 420, 430 can contain more than one camera lens, for example, lenses 415, 450. The handheld device 100 can have a lens 460 placed on the same side of the device 100 as the display 140. The camera lens 405, 415, 425, 435, 450, 460 can be a normal camera lens without imaging artifacts produced by fisheye lenses. A processor associated with the handheld device 100 can receive an image recorded by any of the lenses 405, 415, 425, 435, 450, 460 and combine them into a 360° image.

The lenses 405, 415, 425, 435, 460 can be placed around the perimeter 440 of the handheld device 100. A perimeter of a device, as used in this application, refers to a narrow surface ribbon surrounding a closed curve, where both the narrow surface ribbon and the closed curve are confined to the external surface of the device.

The non-display surface including the sides 400, 410, 420, 430 can contain an optically transparent material such as glass, optically transparent plastic, etc. The lenses 405, 415, 425, 435 can be placed on top of the non-display surface or flush with the non-display surface. When the non-display surface is optically transparent, the lenses 405, 415, 425, 435 can be placed beneath the non-display surface including the sides 400, 410, 420, 430. In addition, the optically transparent non-display surface can act as an additional lens for the cameras of the device 100.

Figure 5:
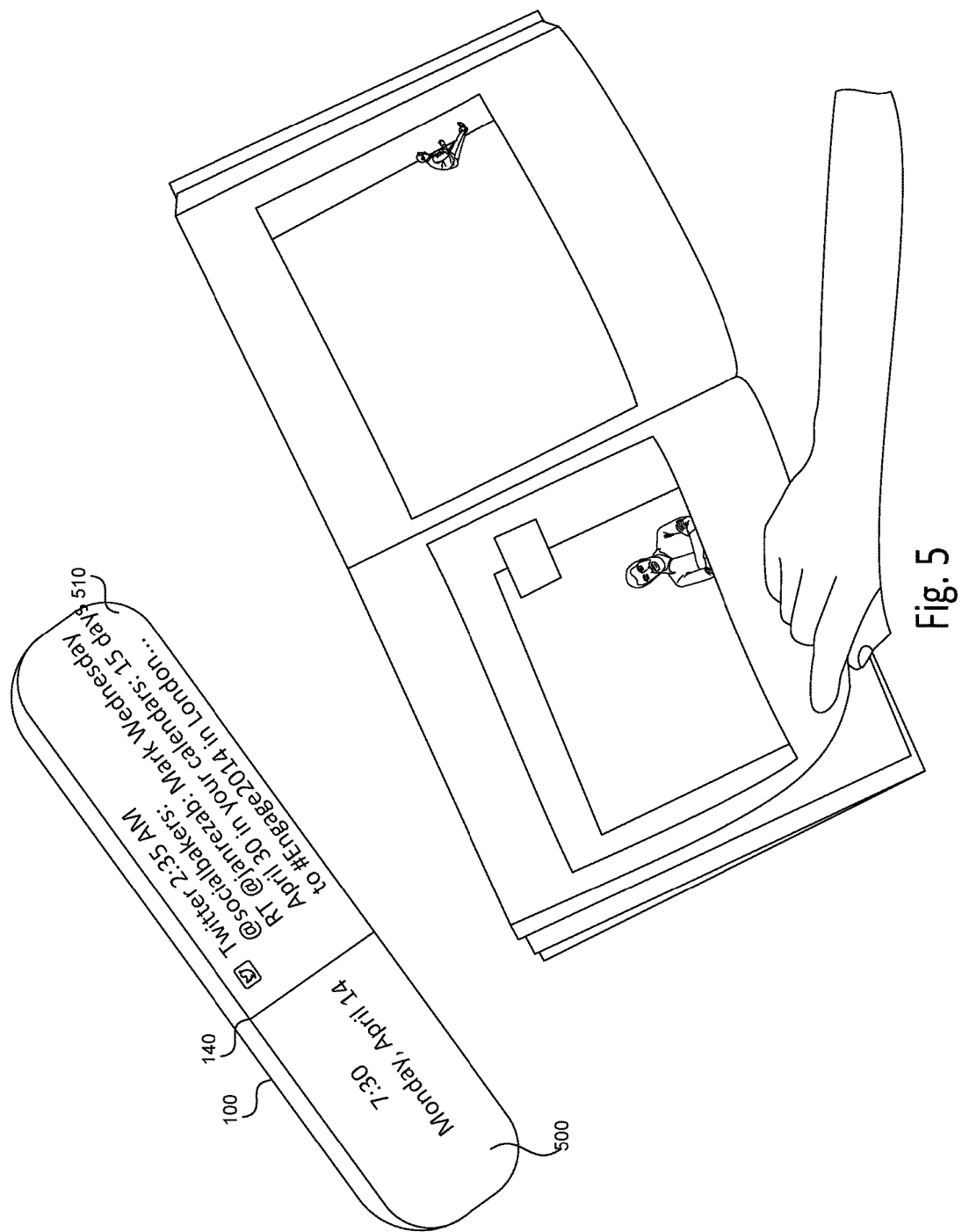
FIG. 5 shows a display on a handheld device resting on a supporting surface.

FIG. 5 shows a display on a handheld device resting on a supporting surface. The handheld device 100 is resting on a non-display surface in contact with the supporting surface. A processor associated with the handheld device 100 can determine a physical property of the handheld device 100 and interpret a user input received based on the physical property of the handheld device 100. Further, based on the physical property, the processor can configure the display 140 of the device 100 accordingly. The physical property of the handheld device can include at least one of a position of the handheld device, an orientation of the handheld device, an acceleration of the handheld device, a velocity of the handheld device, an ambient light surrounding the handheld device, an ambient sound surrounding the handheld device, etc. The position, orientation, acceleration, and velocity of the device 100 can be measured relative to the user of the device 100.

For example, when the handheld device 100 is not moving, i.e., velocity and acceleration of the handheld device 100 are zero, and ambient light surrounding the handheld device 100 is moderate to high, the processor can determine that the handheld device 100 is resting on a surface in a position for the user to view the display 140 of the device 100. The processor can configure the display 140 into two parts 500, 510. Part 500 shows date and time, while part 510 shows an output of an application (such as Twitter) running on the device 100.

In another example, when ambient light surrounding the handheld device 100 is low, and the handheld device 100 is moving, the processor can determine that the handheld device 100 is inside a pocket or a purse. Consequently, the user cannot view the screen, and the handheld device 100 turns off the display 140 to preserve battery life.

Figure 6:
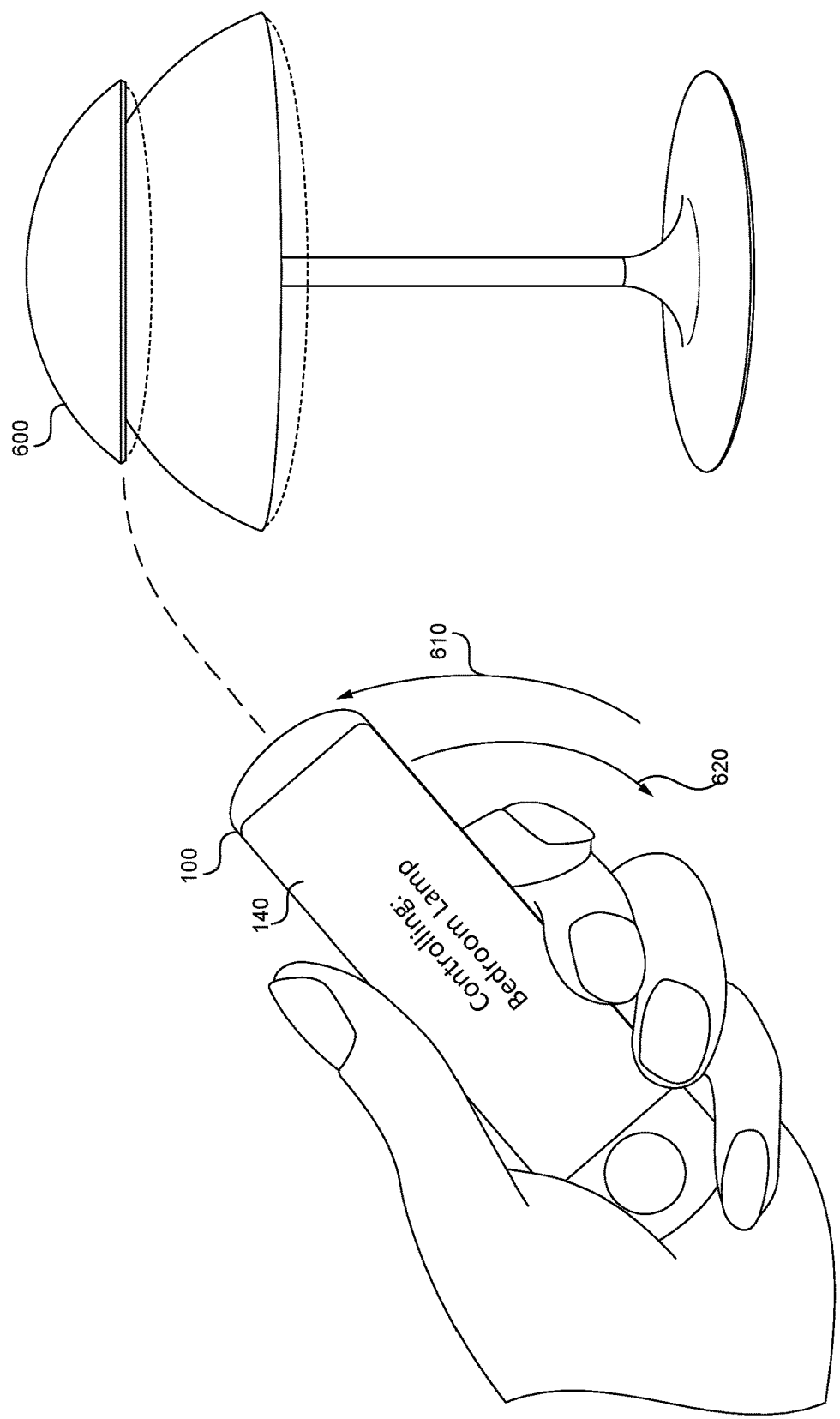
FIG. 6 shows the use of a gestural input and an environment cue to control an appliance using a handheld device.

FIG. 6 shows the use of a gestural input and an environment cue to control an appliance using a handheld device. The user can communicate with the handheld device 100 using various gestural inputs. The use of gestural inputs and voice commands is very important for communicating with the handheld device 100 because the handheld device 100, due to its small size, can be without a physical keyboard or an onscreen keyboard.

For example, when the handheld device 100 is pointed (gestural input) at an appliance (environment cue), a processor associated with the handheld device 100 can interpret the gesture as an instruction to auto pair the handheld device 100 with the appliance at which the device 100 is pointed. To determine that the device 100 is pointed, the processor can detect a deceleration and a threshold period of time during which the device 100 is oriented in substantially the same direction. To determine that the device 100 is pointed at the appliance, the appliance being the environment cue, the processor can utilize a camera disposed on the backside of the device 100 to determine an object in the center of the cameras point of view. When the object is the appliance, the processor can proceed to pair the device 100 and the appliance.

In FIG. 6, after the processor determines the device 100 is pointed at a lamp 600, the processor can automatically pair the device 100 and the lamp 600 for communication using Bluetooth, near field communication (NFC), Wi-Fi, ultrasound communication, etc. After the device 100 and the lamp 600 are paired, the user can control the lamp 600 using the device 100. For example, a gestural input 610 lifting the device 100 upward, increases the brightness of the lamp 600. Conversely, a gestural input 620 lowering the device 100 downward reduces the brightness of the lamp 600. The display 140 can show how the gestural input is being interpreted.

Figure 7A:
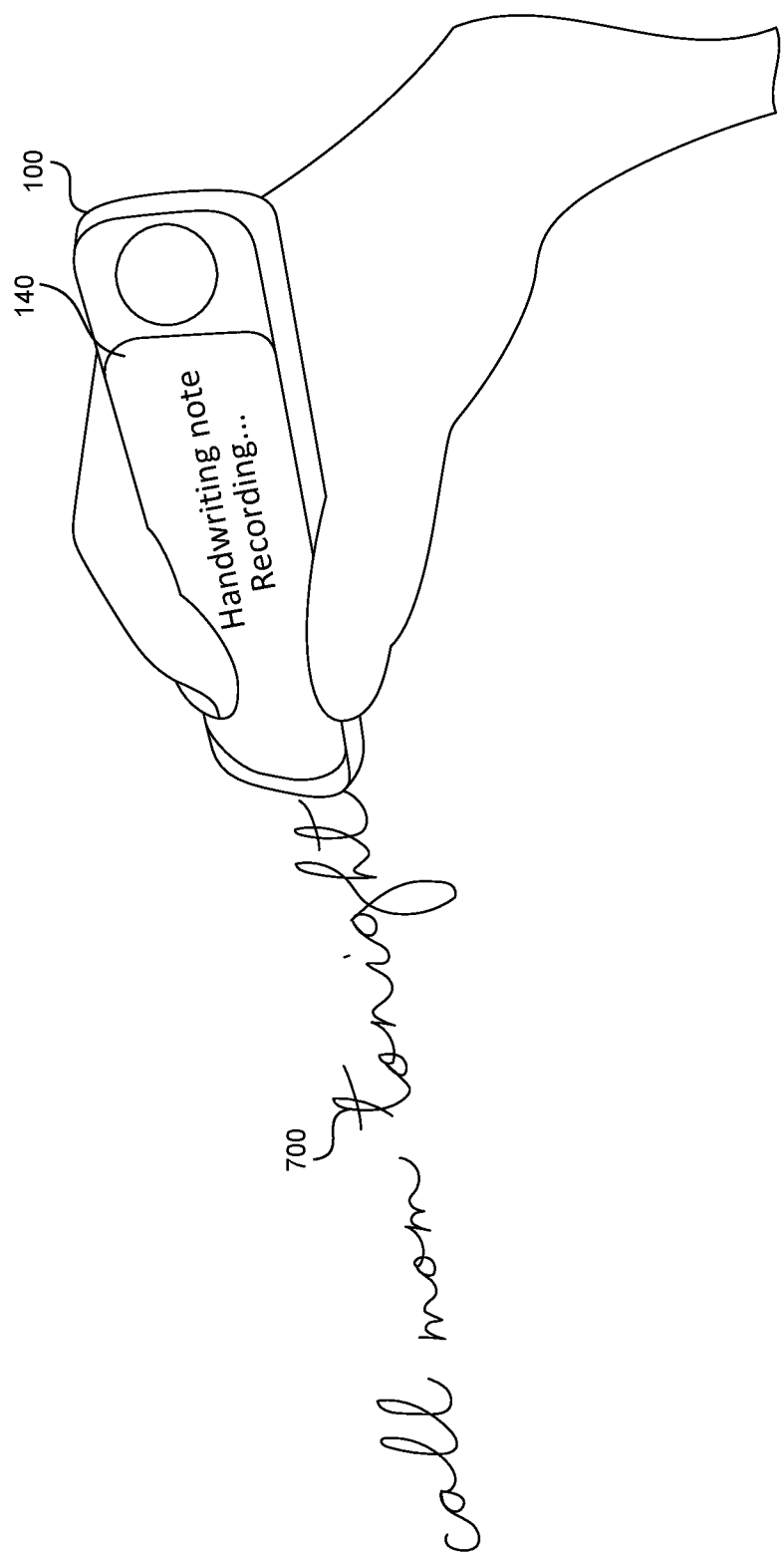
FIG. 7A shows the use of a gesture to input text into a handheld device.

FIG. 7A shows the use of a gesture to input text into a handheld device. A processor associated with the handheld device 100 can detect a gestural input 700, such as a writing by hand. Given the small size of the handheld device 100, utilizing handwriting as a gestural input is very important because the handheld device 100 can be without a physical keyboard or an onscreen keyboard, and handwriting can be the only means of receiving textual input. The handheld device 100 can be pressed against a surface to write, or the handheld device 100 can be in the air so that the user can write in the air. When the processor detects the gestural input 700, the processor can record the user's handwritten notes. Given that the size of the handheld device 100 substantially corresponds to the whiteboard marker, using the handheld device 100 for handwriting is intuitive. The processor can record the handwritten pattern and save it as an image which can be emailed, posted online, etc. The processor can also perform optical character recognition of the handwritten pattern and convert the handwritten pattern to text. Further, the processor can convert the handwritten pattern into a voice recording and send a voice message. Detecting the handwriting as gestural input 700 is useful when a user wants to create a note without having to say it, such as in a meeting, in a crowded place, etc. Further, the ability to create notes by handwriting allows the handheld device 100 to not have a physical keyboard or an onscreen keyboard and still receive textual input from the user. The display 140 of the handheld device 100 can show how the gestural input 700 is being interpreted.

Figure 7B:
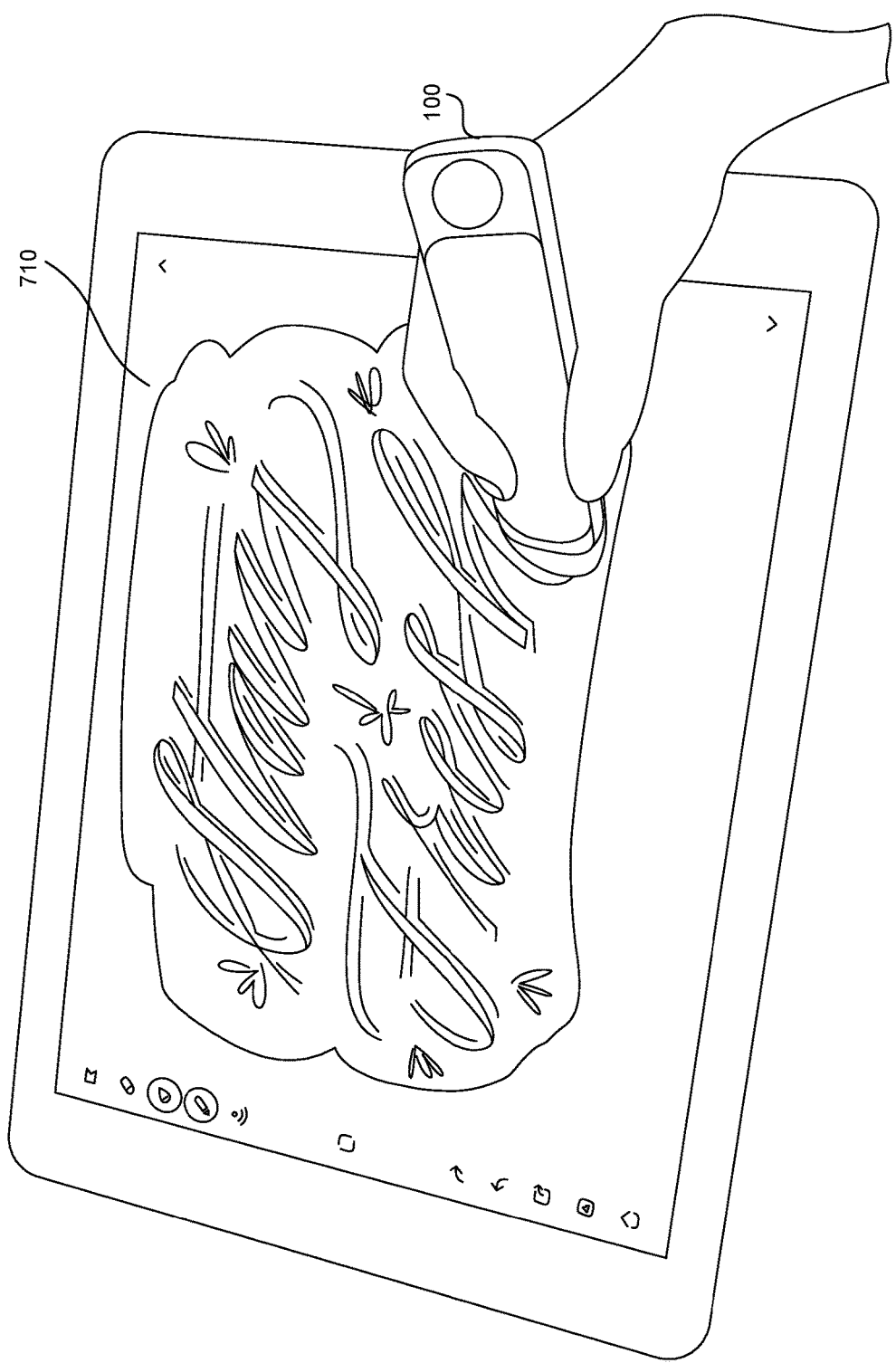
FIG. 7B shows the use of a handheld device as a computer stylus.

FIG. 7B shows the use of a handheld device as a computer stylus. When a processor associated with the device 100 detects that the device 100 is pressed against a conductive surface 710 such as touchscreen, the handheld device can act as a computer stylus and allow the touch screen 710 to record the motion of the stylus. In this case, the gestural input is the pressing of the device 100 against an object. Determining that the object is the conductive surface 710 is the environment cue.

Figure 8B:
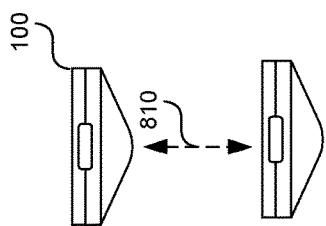
FIGS. 8A-8C show the use of a gestural input to perform image processing operations on a handheld device.
Figure 8C:
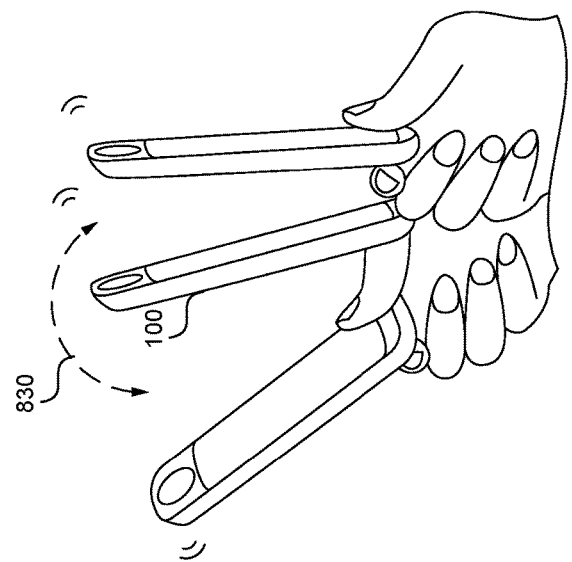
Figure 8A:
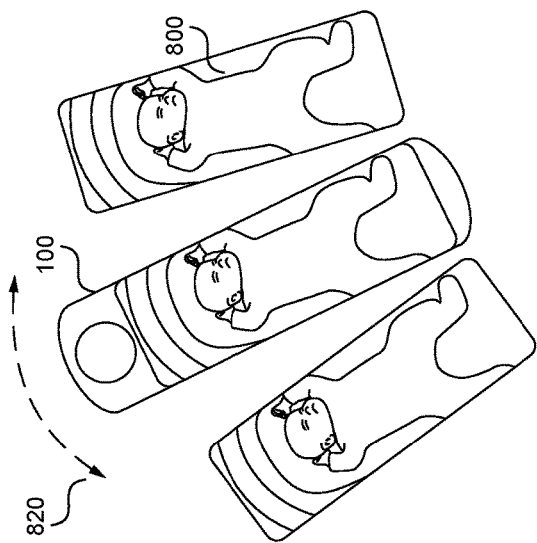

FIGS. 8A-8C show the use of a gestural input to perform image processing operations on a handheld device. When an image and/or a video is displayed on the display 140 of the handheld device 100, a processor associated with the device 100 can perform various image processing operations using gestural inputs. Gestural inputs can be moving the device up and down 810, left to right 820, forward and back 830. For example, moving the device up and down can cause the processor to zoom in or zoom out from the image 800. In another example, moving the device left to right or forward and back, can cause the processor to apply various image processing filters such as adjusting brightness, color, contrast, converting the image to black and white, etc.

Figure 9B:
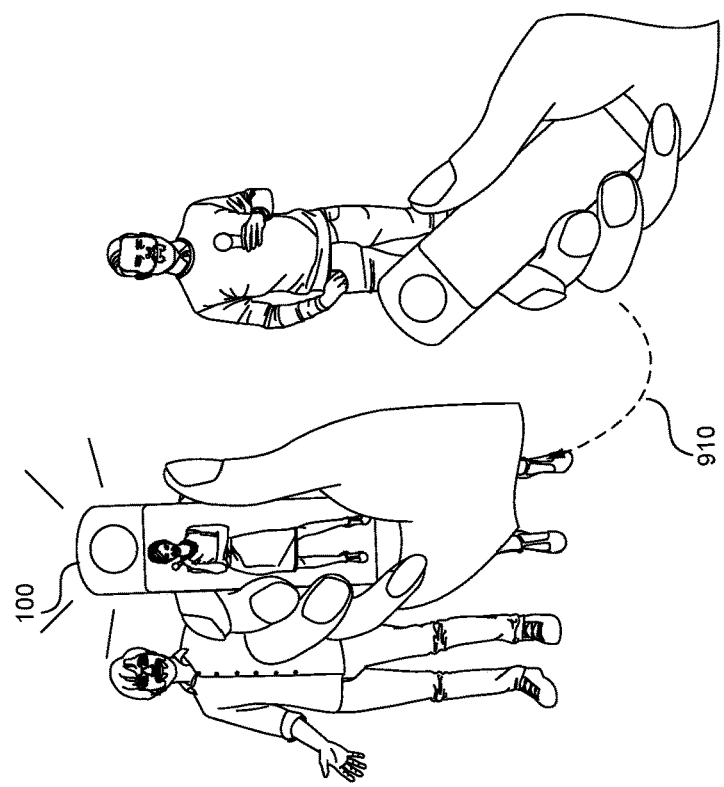
FIGS. 9A-9B show the use of a gestural input to record an image with a handheld device.
Figure 9A:
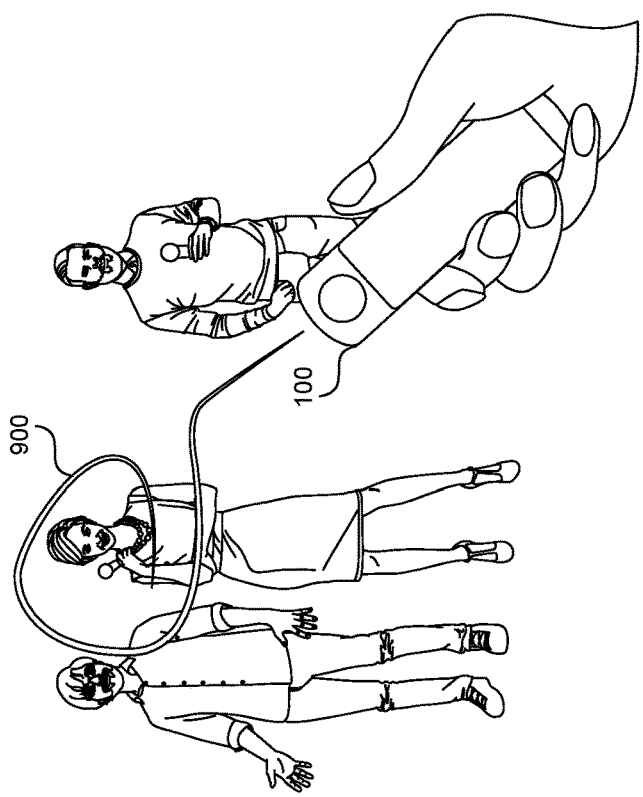

FIGS. 9A-9B show the use of a gestural input to record an image with a handheld device. A processor associated with the handheld device 100 can detect that the user wants to record an image of an object in the environment when the processor receives a gestural input 900 such as circling the device 100 around an environment object. The processor can utilize a camera placed on back of the device 100 to detect the object of interest in the environment. After completing the circling gesture 900, the user can move the device 100 into position to take the picture using gestural input 910. Without pressing any buttons or issuing any additional commands, the device 100 can record an image of the object in the environment that the processor has previously identified as the object of interest.

Figure 10:
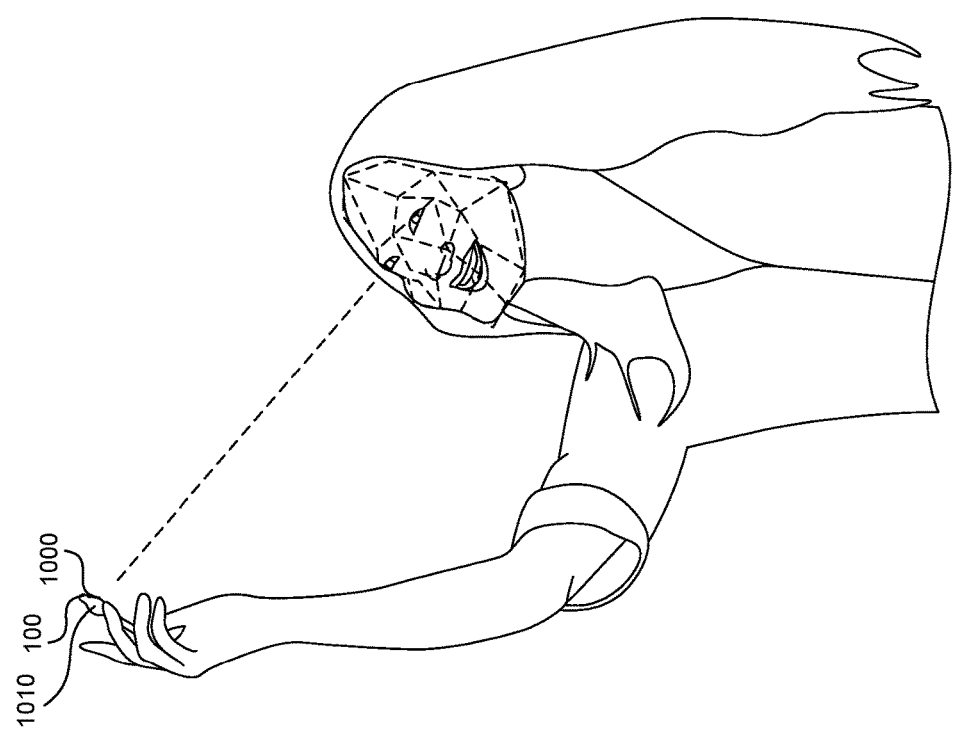
FIG. 10 shows the use of a gestural input and an environment cue to record a selfie with a handheld device.

FIG. 10 shows the use of a gestural input and an environment cue to record a selfie with a handheld device. The handheld device 100 can contain a front facing camera 1000 and/or a 360° camera 1010. When the processor associated with the device 100 detects that the device is being held up to a predetermined angle, such as 20° or more away from the vertical axis, and the camera 1000, 1010 has a smiling face in the camera's field of view, the processor interprets the gesture as an instruction to record a selfie. In this case, the gestural input is the positioning of the device 100 at the predetermined angle, while the environment cue is the detection of smiling faces. Only the gestural input and the environment cue is needed; no additional button presses, commands, shutter adjustments, previews and focusing instructions are needed to record the image. When the camera is the 360° camera 1010, the recorded image is a selfie containing a 360° view of the environment.

FIG. 11 shows the use of a gestural input and an environment cue to record a group picture with multiple handheld devices. When multiple handheld devices 1100, 1110 are close to each other, and the devices are oriented to take a selfie picture, in addition to recording the selfie picture, the multiple handheld devices 1100, 1110 can communicate with each other to create the group picture. In this case, the gestural input is positioning of the handheld devices 1100, 1110 in the selfie position, and the environment cues are detection of smiling faces as well as proximity of other handheld devices.

The group picture consists of multiple selfie pictures stitched together into a single photo. In addition, because there are two or more cameras 1120, 1130 associated with each handheld device 1100, 1110, the multiple pictures generated by the multiple cameras 1120, 1130 can be used to distinguish the foreground from the background in the multiple selfies. As a result, the background can be blurred, while the foreground can be sharpened to produce a more pleasing group picture. The group picture can be saved to some or all of the multiple handheld devices 1100, 1110 that have recorded a selfie, or the group picture can be saved to all the handheld devices 1100, 1110 within a predetermined range.

Figure 12:
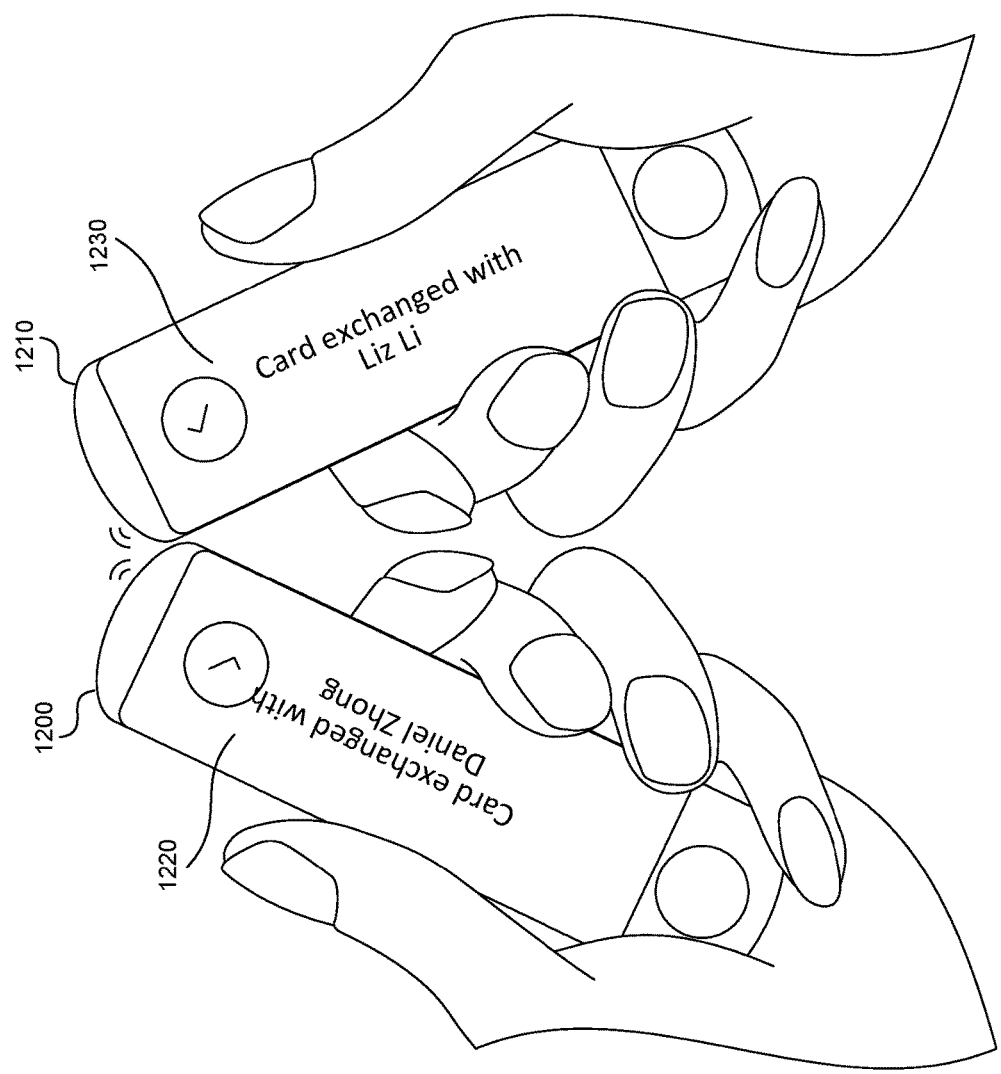
FIG. 12 shows the use of a gestural input and an environment cue to exchange information between handheld devices.

FIG. 12 shows the use of a gestural input and an environment cue to exchange information between handheld devices. A processor associated with the handheld device 1200, 1210 can detect a gestural input such as a squeeze, i.e., pressure on both sides of the device 1200, 1210. Further, the processor can detect an environmental cue such as the device 1200, 1210 coming into contact with another device 1200, 1210 enabled for electronic communication. The contact can be a touch, a bump, etc. The processor interprets the gesture and the environmental cue as an instruction to exchange information between the two devices 1200, 1210. No additional gestural inputs are needed such as phone unlocking, typing, launching an application, scanning, clicking, etc.—squeezing and contact are sufficient to exchange information.

The displays 1220, 1230 associated with the handheld devices 1200, 1210 display the how the gestural input and the environment cue are interpreted. The information exchanged can be information contained in a business card, associated with the devices 1200, 1210, money, etc.

Figure 13:
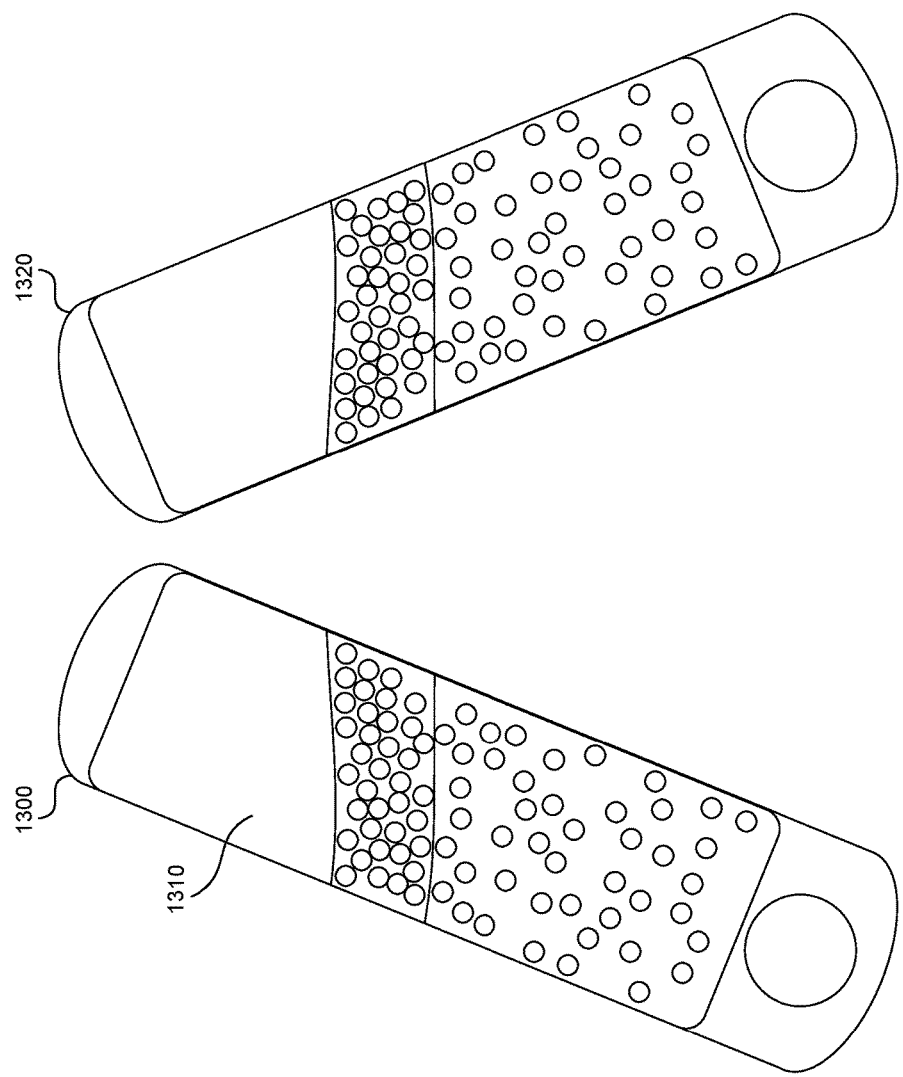
FIG. 13 shows a physical simulation application running on a handheld device and responding to a physical property of the handheld device.

FIG. 13 shows a physical simulation application running on a handheld device and responding to a physical property of the handheld device. The handheld device 1300 can contain various sensors to measure the device's position, speed, acceleration, and orientation. In addition, a physical simulation can run on the device, such as a liquid contained within a glass shaped like the screen 1310 of the handheld device 1300. Additional simulations can be run, such as a billiard table, simulation of objects falling under gravity, etc. The simulation can respond to the various physical properties of the device. For example, bumping the handheld device 1300 against another handheld device 1320 can cause the liquid simulation to ripple on the display 1310.

Figure 14:
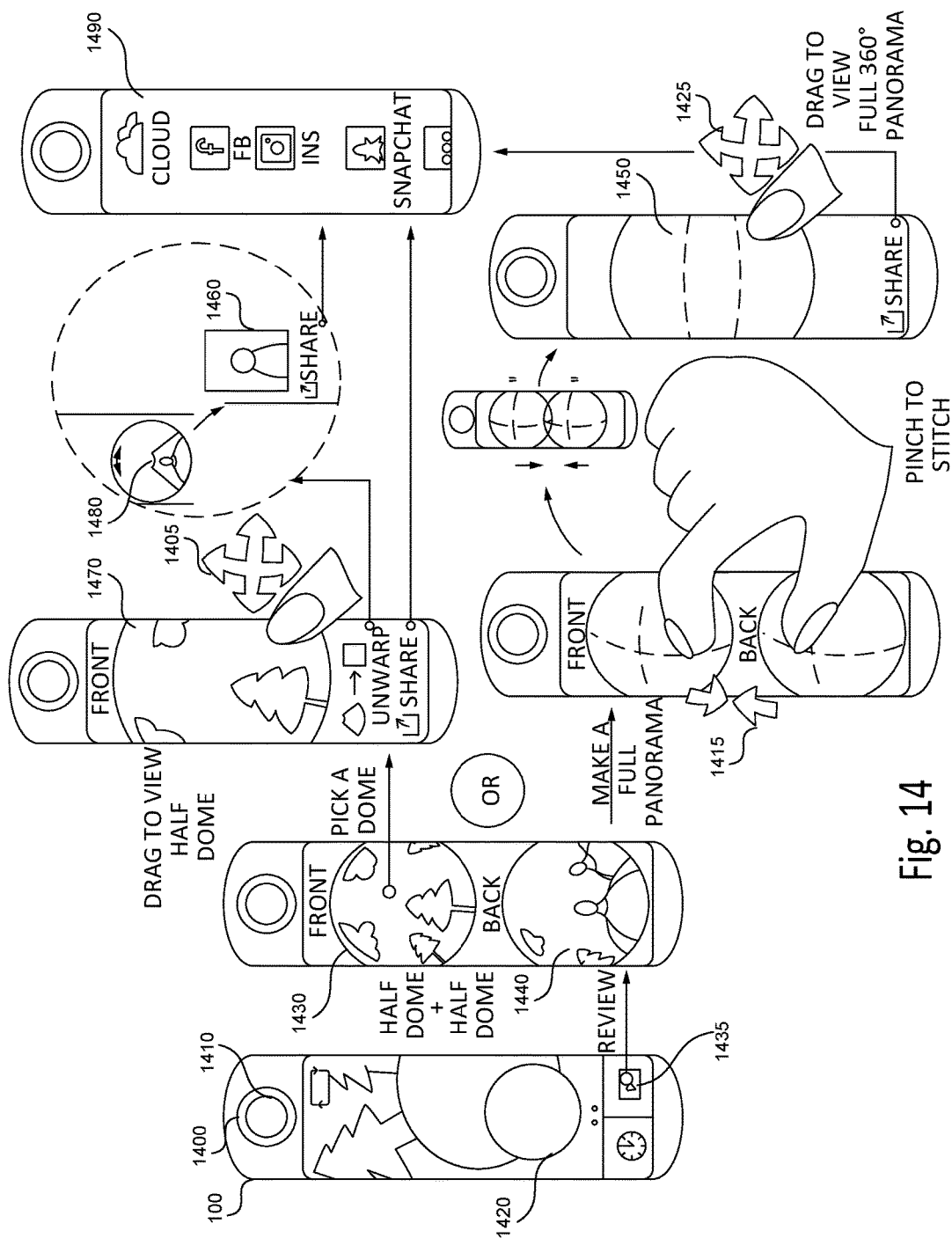
FIG. 14 shows the use of a gestural input to record and edit an image using a handheld device.

FIG. 14 shows the use of a gestural input to record and edit an image using a handheld device. The handheld device 100 can have a 360° camera 1400 associated with it. The camera 1400 contains a front lens 1410, and a back lens (not pictured). The front lens and the back lens can be fisheye lenses recording more than 180° images around the lens. By pressing a predefined region 1420 on the display 140 of the handheld device 100, the camera 1400 records the 360° image of the environment. When a preview button 1435 is pressed, the display 1400 shows the images 1430, 1440 recorded by the front 1410 and back lens, respectively.

The user can choose to create a full panorama 1450, or create a regular image 1460. If the user chooses to create the regular image 1460, the user can select the front 1430 or the back 1440 image by dragging the front 1430 or the back 1440 image toward the center of the display 140. The user can orient the selected image 1470 using user inputs 1405 such as dragging the selected image 1470 up and down, or left and right. Once the area of interest 1480 in the selected image 1470 has been designated, the user can unwrap the distorted image 1480 to obtain the regular image 1460. The user can transmit the image to various social networking sites, a cloud etc., as shown on the display 1490.

If the user chooses to create the full panorama 1450, the user can stitch the front 1430 and the back 1440 image using user input 1415 such as pinching to create the full panorama 1450. The user can use user inputs 1425 such as dragging the full panorama 1450 left and right, and up and down to view various parts of the full panorama 1450.

Figure 15A:
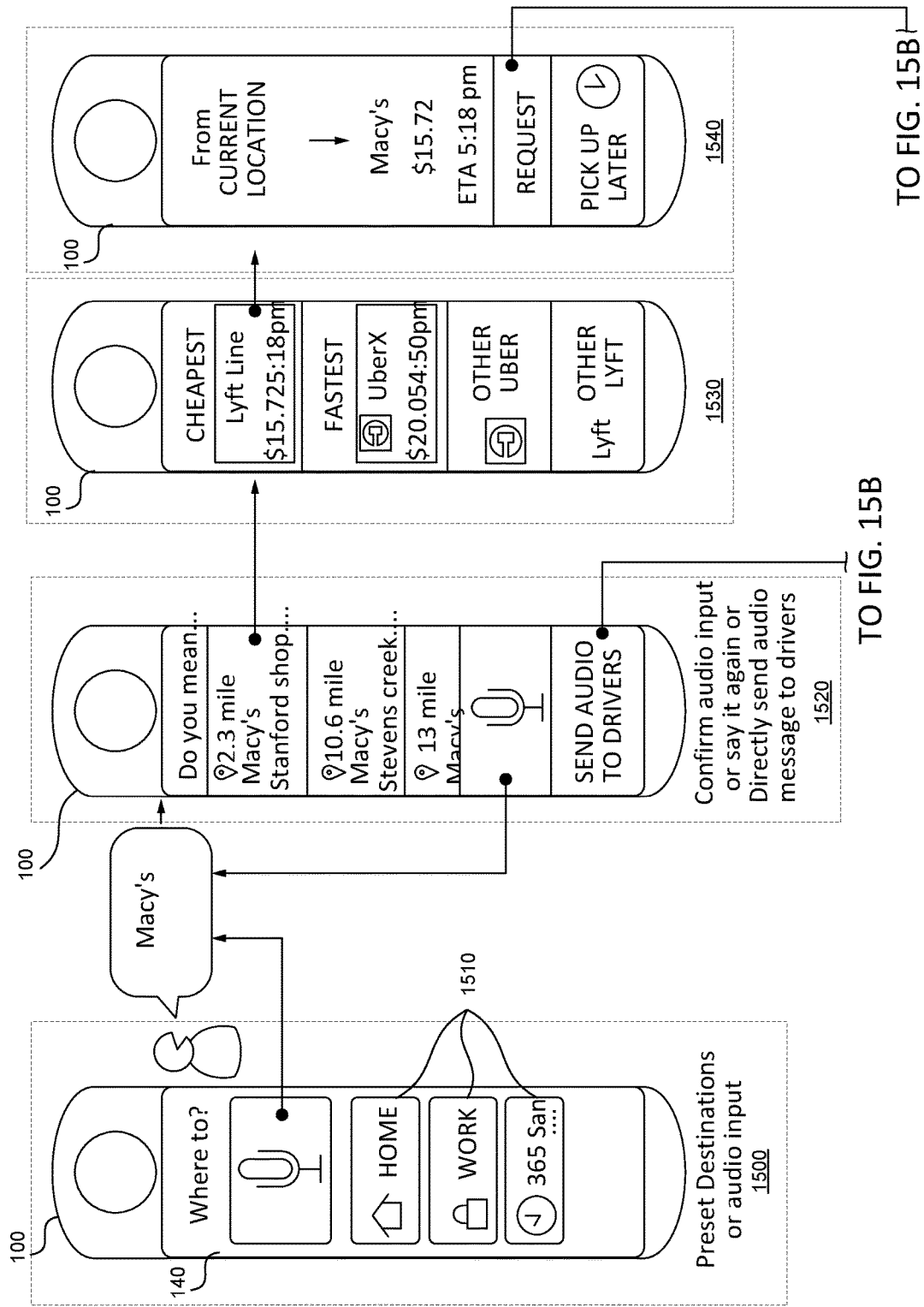
FIGS. 15A-15B shows using a voice input to communicate with a handheld device.
Figure 15B:
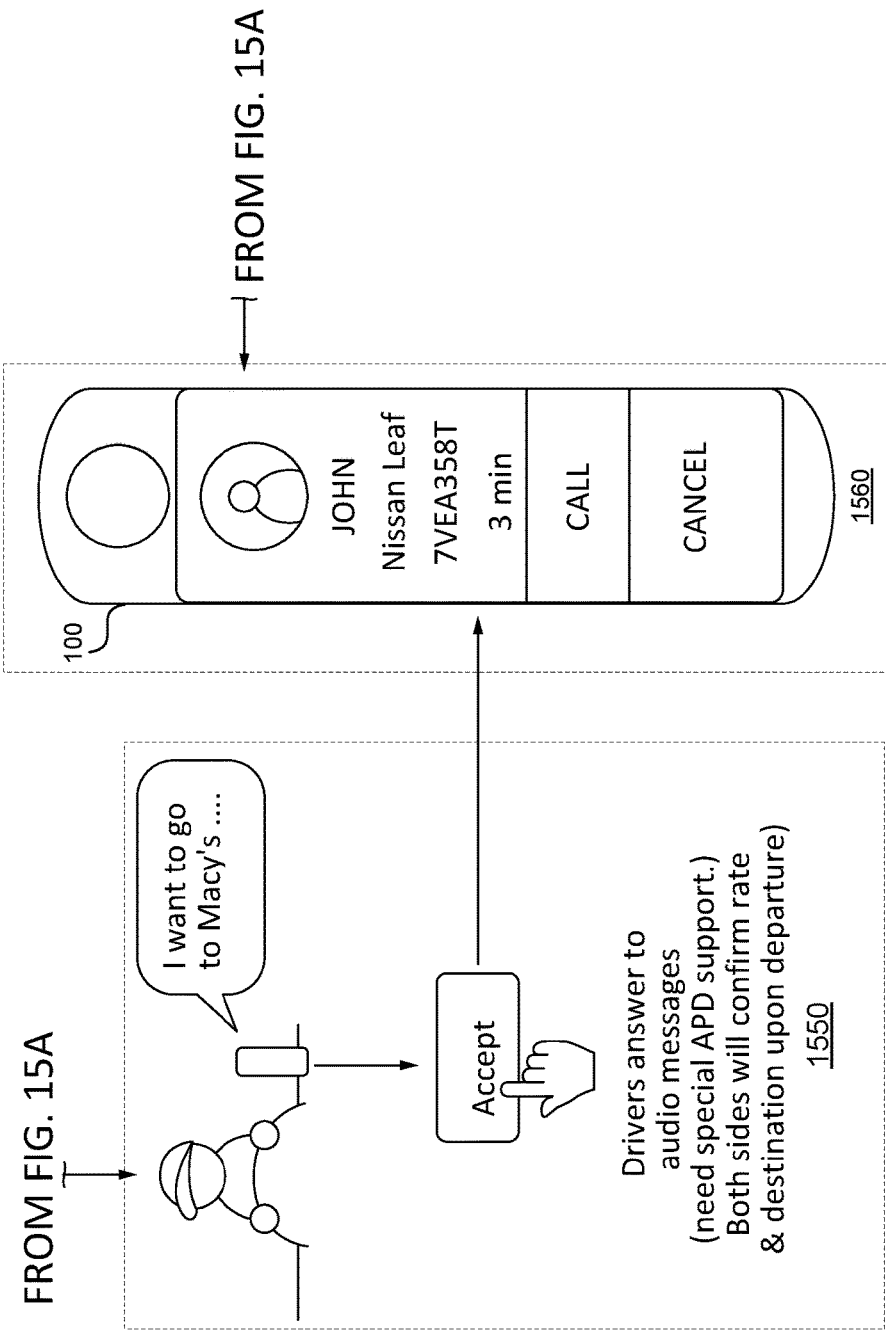

FIGS. 15A-15B shows using a voice input to communicate with a handheld device. The handheld device 100 can receive voice input from the user. For example, in step 1500, the user can specify a travel destination to the device 100 using voice or by selecting a preset destination 1510 from a list shown on the display 140 of the device 100. In step 1520, the handheld device 100 can receive voice input from the user to confirm the travel destination, and/or to send the audio input directly to a driver. The handheld device 100 can automatically provide information on whether the person needs any APD, i.e., disability support along with the voice message. In step 1530, the device 100 can receive a selection of travel services such as Lyft, Uber, etc. Once the selection of the travel services is made in step 1540, the device 100 can schedule pick up for the user. In FIG. 15B, step 1550 the driver can receive the audio message from the user and accept the fare. In step 1560, the mobile device 100 displays the information associated with the driver assigned to assist the user.

Figure 16A:
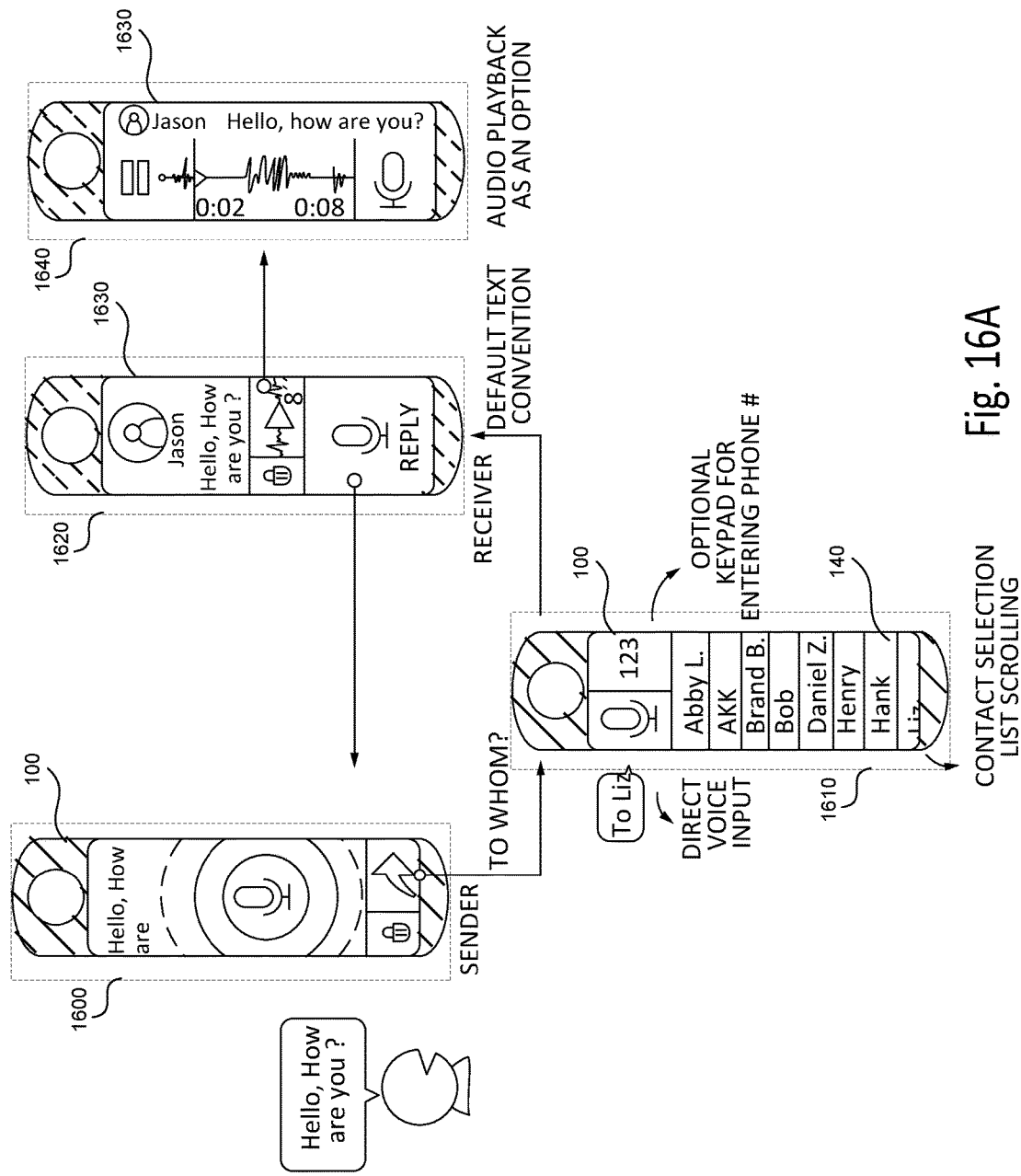
FIGS. 16A-16B shows using a voice input to send text messages with a handheld device.
Figure 16B:
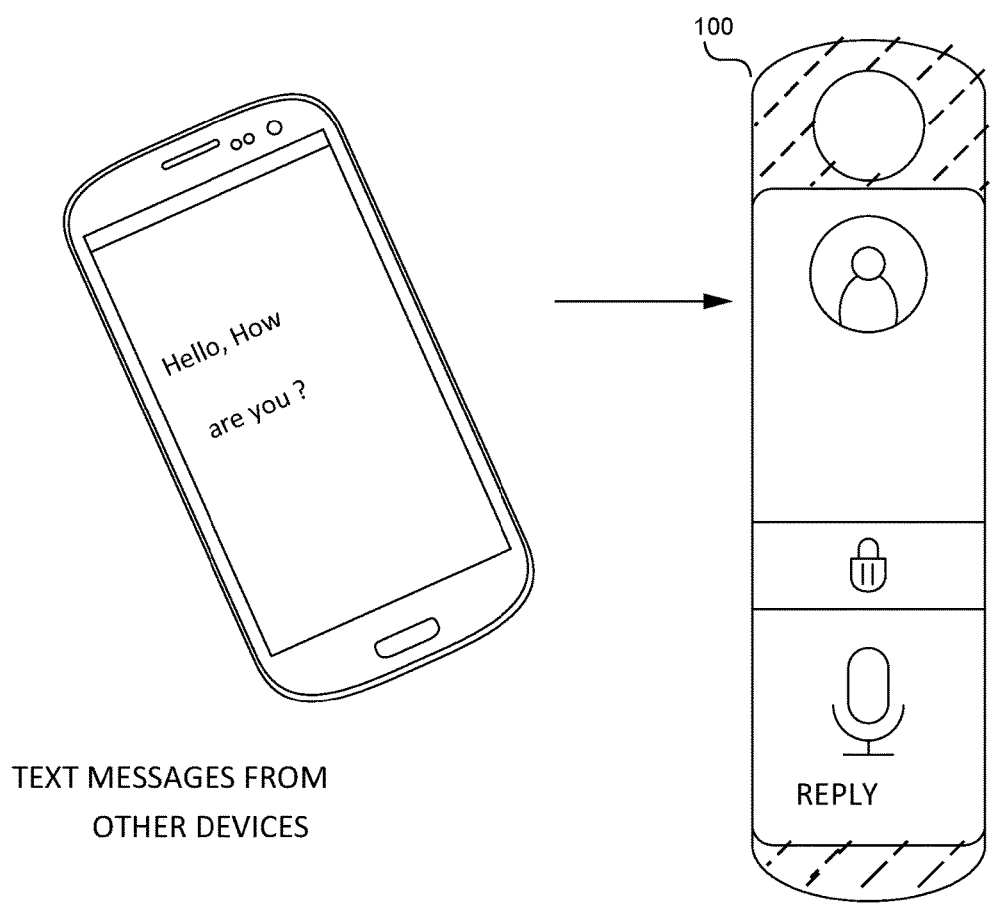

FIGS. 16A-16B shows using a voice input to send text messages with a handheld device. In step 1600, the handheld device 100 can receive a voice input from a user. The voice input can be a message to send to another handheld device 1630 associated with a message receiver. In step 1610, the handheld device receives an instruction from the user regarding who is the message receiver. The instruction can be received via a voice input or by selecting the receiver from a list shown on the display 140 of the handheld device 100. In step 1620, a handheld device 1630 receives the message. The handheld device 1630 can transcribe the message into a text and present the text to the user. Optionally, in step 1640, the device 1630 can present the message using audio playback.

In FIG. 16B, the handheld device 100 can receive a text message from a device such as a cell phone, a tablet, etc. The device 100 can respond to the text message using text or by sending a recorded voice input as a response. The device 100 can also transcribe the received text message into an audio message.

Figure 17A:
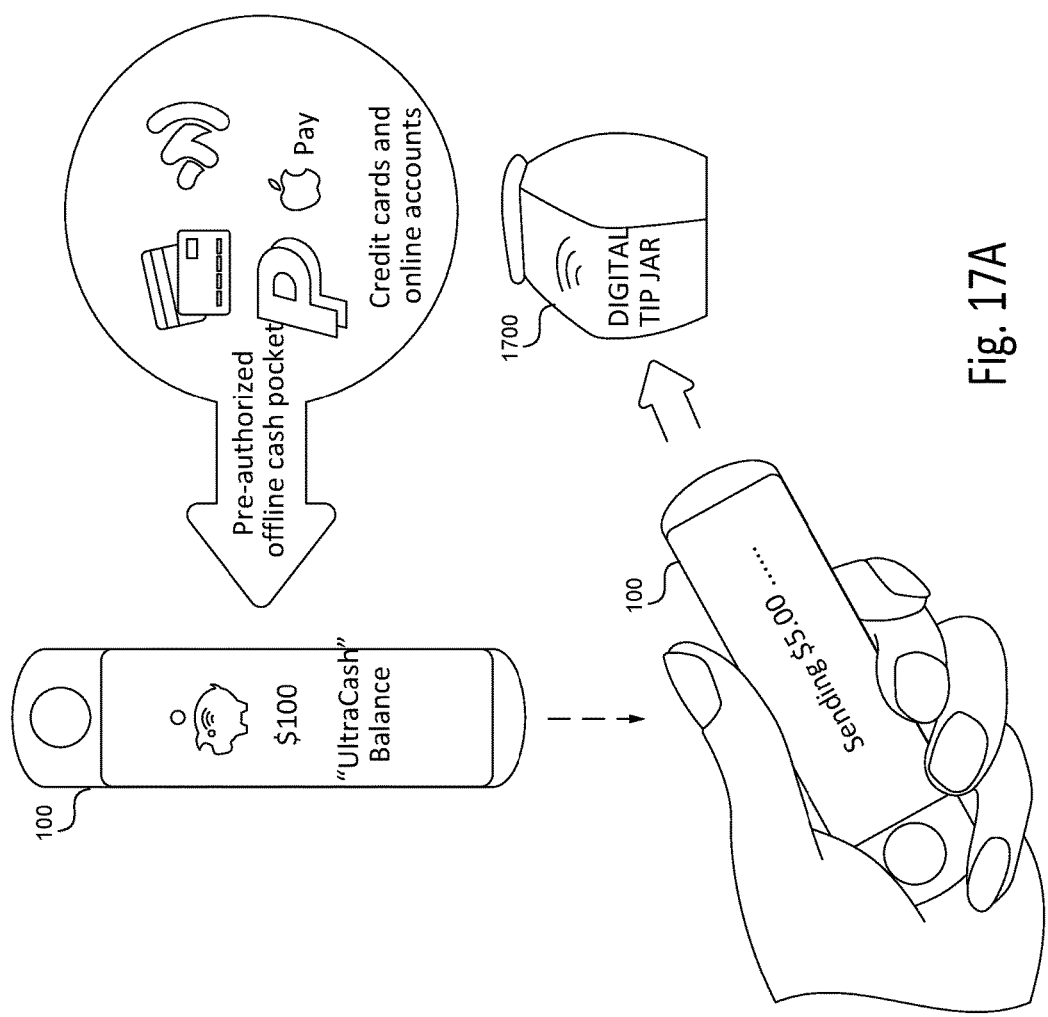
FIGS. 17A-17B show an off-line payment using a handheld device.
Figure 17B:
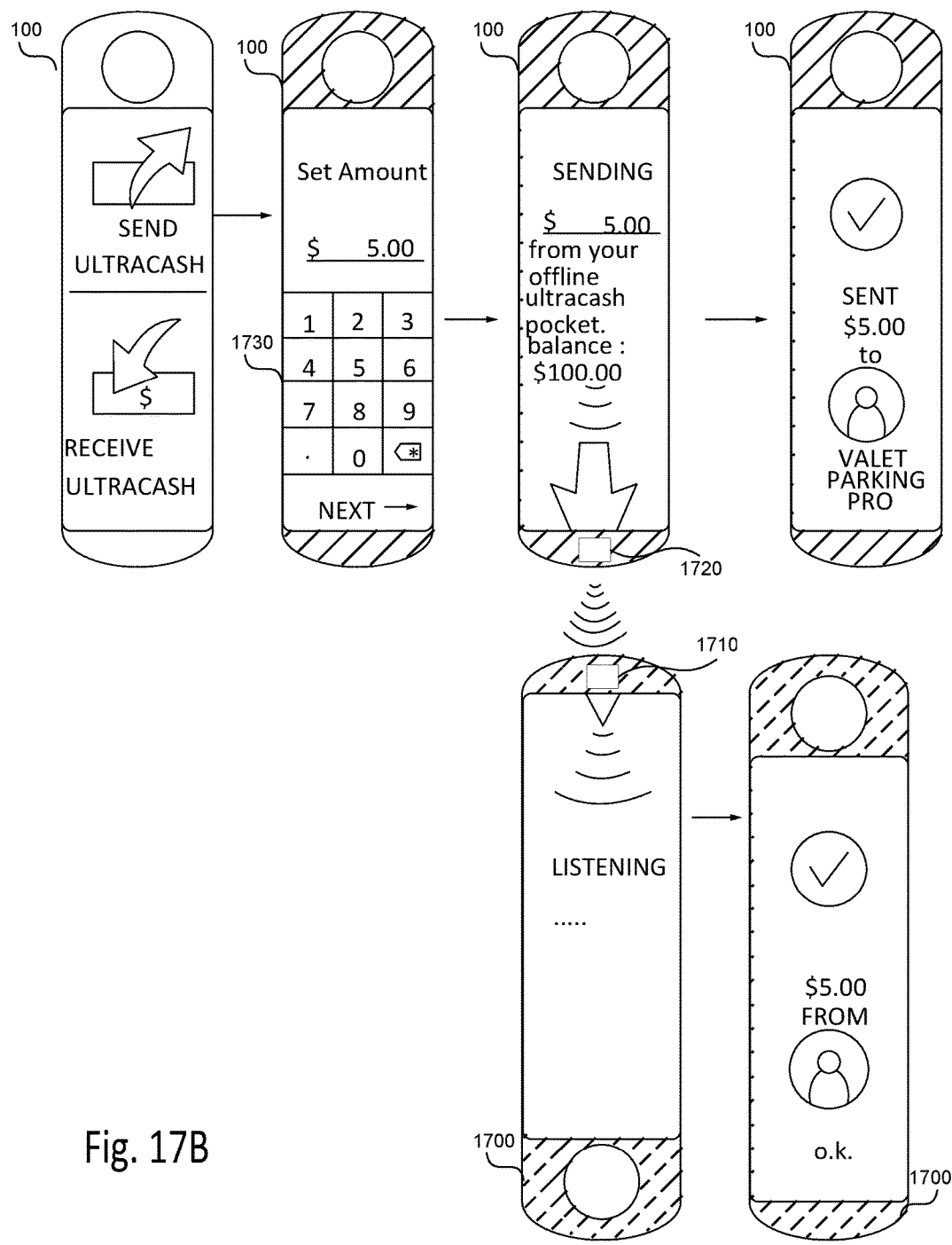

FIGS. 17A-17B show an off-line payment using a handheld device. The handheld device 100 can be pre-authorized to spend a predetermined amount of cash, such as $100, by a digital payment provider such as a credit card, Google wallet, PayPal, Apple pay, etc., when the handheld device 100 is connected to the Internet. The handheld device 100 can utilize the preauthorized cash to make payments to an Internet connected device, and/or to a device 1700 that is not connected to the Internet but is enabled for electronic communication. The device 1700 can be a digital tip jar as shown in FIG. 17A, a digital payment collector at a national park, another handheld device as shown in FIG. 17B. For example, the device 100 can utilize Bluetooth, NFC, mesh networks, ultrasound, to communicate with another device that is off-line. To make the payment, the device 100 can be pointed at the device 1700, as described in this application, or device 100 can come into contact with the device 1700.

As shown in FIG. 17B, the payer device 100 can query the user whether the user wants to send or receive the preauthorized cash off-line. Upon selecting the appropriate option, the payer device 100 can transfer the payment to another handheld device 1700, i.e., payee device, in an off-line fashion using ultrasound, Bluetooth, NFC, mesh networks, etc. The payer device 100 can have an ultrasound speaker 1720 to transmit an ultrasound communication to the payee device 1700. The payee device 1700 can have a microphone 1710 to receive the ultrasound communication from the payer device 100. Upon completing the transaction, both the payer device 100 and the payee device 1700 display an informational message to the user regarding the completed transaction.

As shown in FIG. 17B, a partial keyboard 1730 containing only the numbers can be displayed on the device 100. Due to the small size, the device 100 cannot display the full keyboard, or the keyboard containing all the letters.

FIGS. 18A-18B show payment authorization using a handheld device. As shown in FIG. 18A, the device 100 contains a fingerprint sensor 1800 disposed on a non-display side of the device 100. The device 100 authorizes a payment by matching the received fingerprint and received voice input against an authorized fingerprint and voice input, respectively. In one embodiment, the device 100 makes the final payment once the device 100 receives an authorized fingerprint and detects a squeeze of the device 100.

Figure 19A:
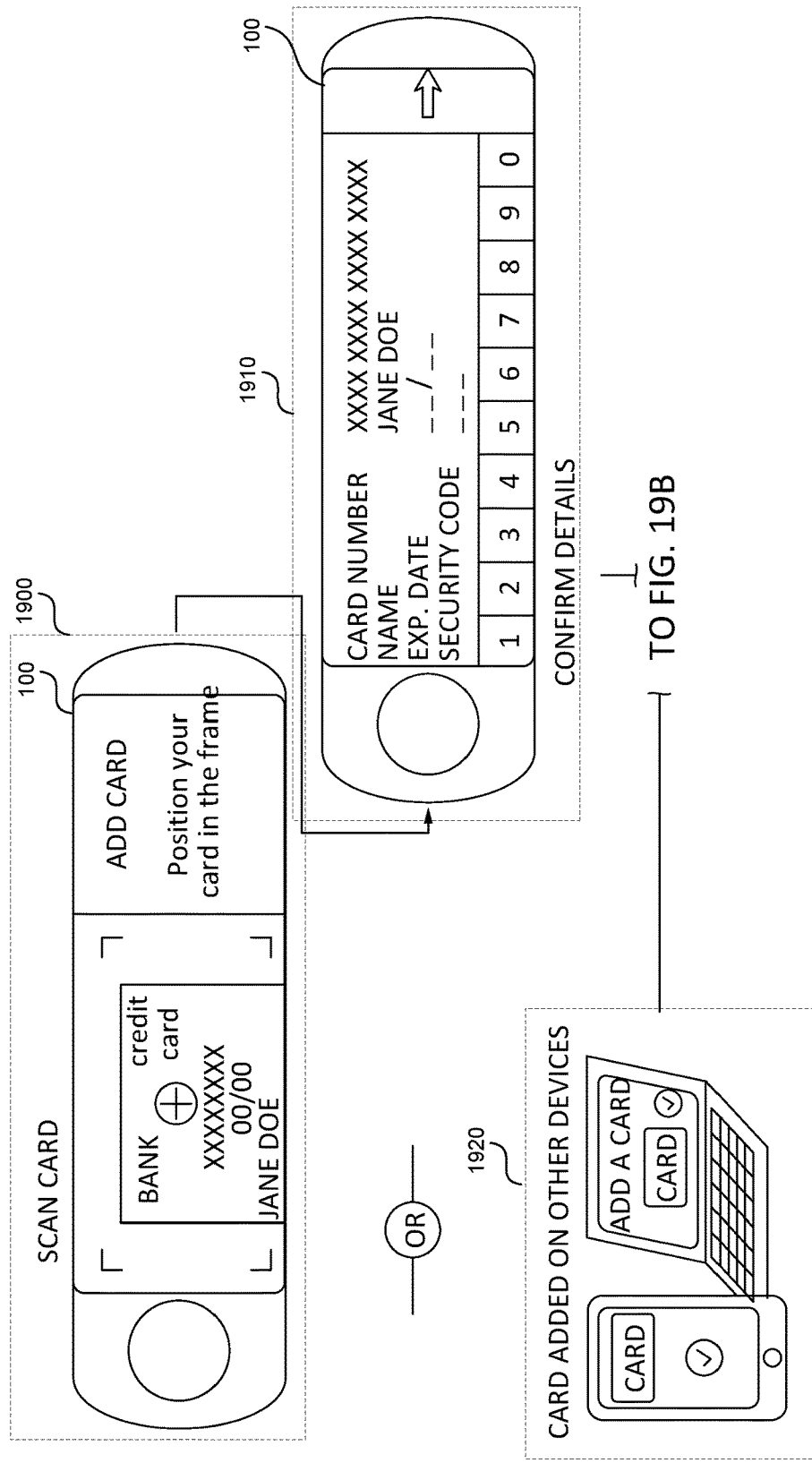
FIGS. 19A-19B show a credit card payment using a handheld device.
Figure 19B:
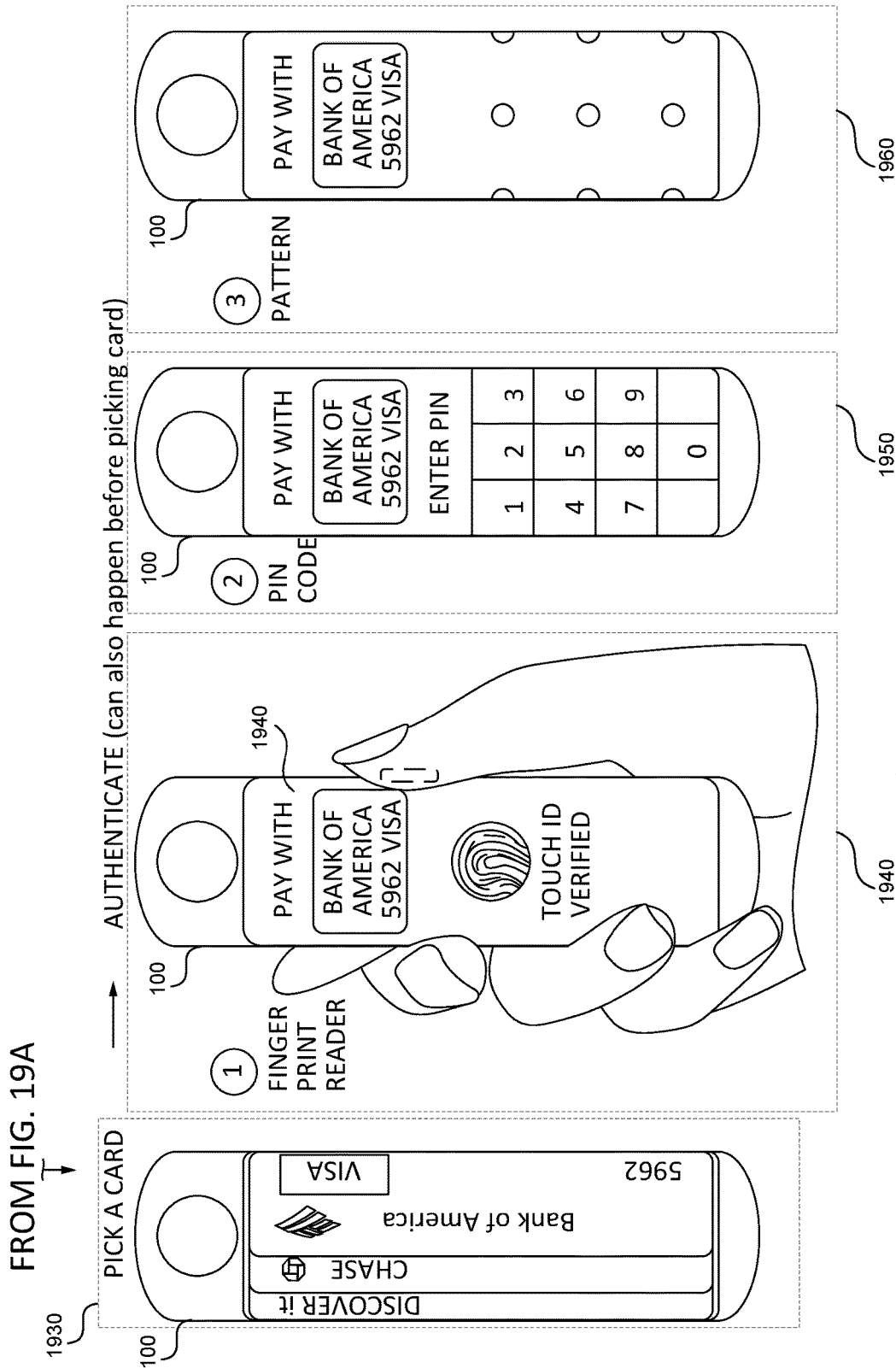

FIGS. 19A-19B show a credit card payment using a handheld device. In step 1900, the handheld device 100 can receive credit card information by taking a picture of the credit card. In step 1910, the device 100 recognizes the information contained in the picture, converts the information into text, and asks the user to correct any mistakes in the credit card information. Alternatively, in step 1920, the handheld device 100 can receive credit card information from other devices such as cell phones, laptops, tablets, etc.

In step 1930, the device 100 receives the selection of a card to be used in the payment. In step 1940, the device 100 authenticates the user using fingerprint and/or voice. The display 140 of the device 100 can display information regarding the card used and the authentication method used. Step 1930 can be performed before or after step 1940. In addition to, or instead of the voice and fingerprint authentication, the device 100 can authenticate the user using a pin, as shown in step 1950 and/or using a pattern, as shown in step 1960. Various authentication methods can be used alone or can be combined. The payment can be communicated to an external device using near field communication (NFC) Bluetooth, Internet, ultrasound, mesh networks, etc.

FIG. 20A shows the use of a handheld device in payment by scanning. The handheld device 100 can be preregistered and authorized to use an online payment account such as PayPal, Google wallet, Apple pay, etc. The handheld device 100 can be used to pay or to receive money. The handheld device 100 can display a payment option 2000 or a receive money option 2010. When the user selects the payment option 2000, in step 2020, the handheld device 100 displays a quick response (QR) code containing information associated with the user's account. The device 100 can also scan a barcode 2030 of an item that the user wants to purchase. In step 2040, a vendor can scan the QR code from the display 140 of the device 100. Upon a successful scan, in step 2050, the display 140 informs the user that the price for item encoded in the barcode 2030 has been paid to the vendor.

Figure 20B:
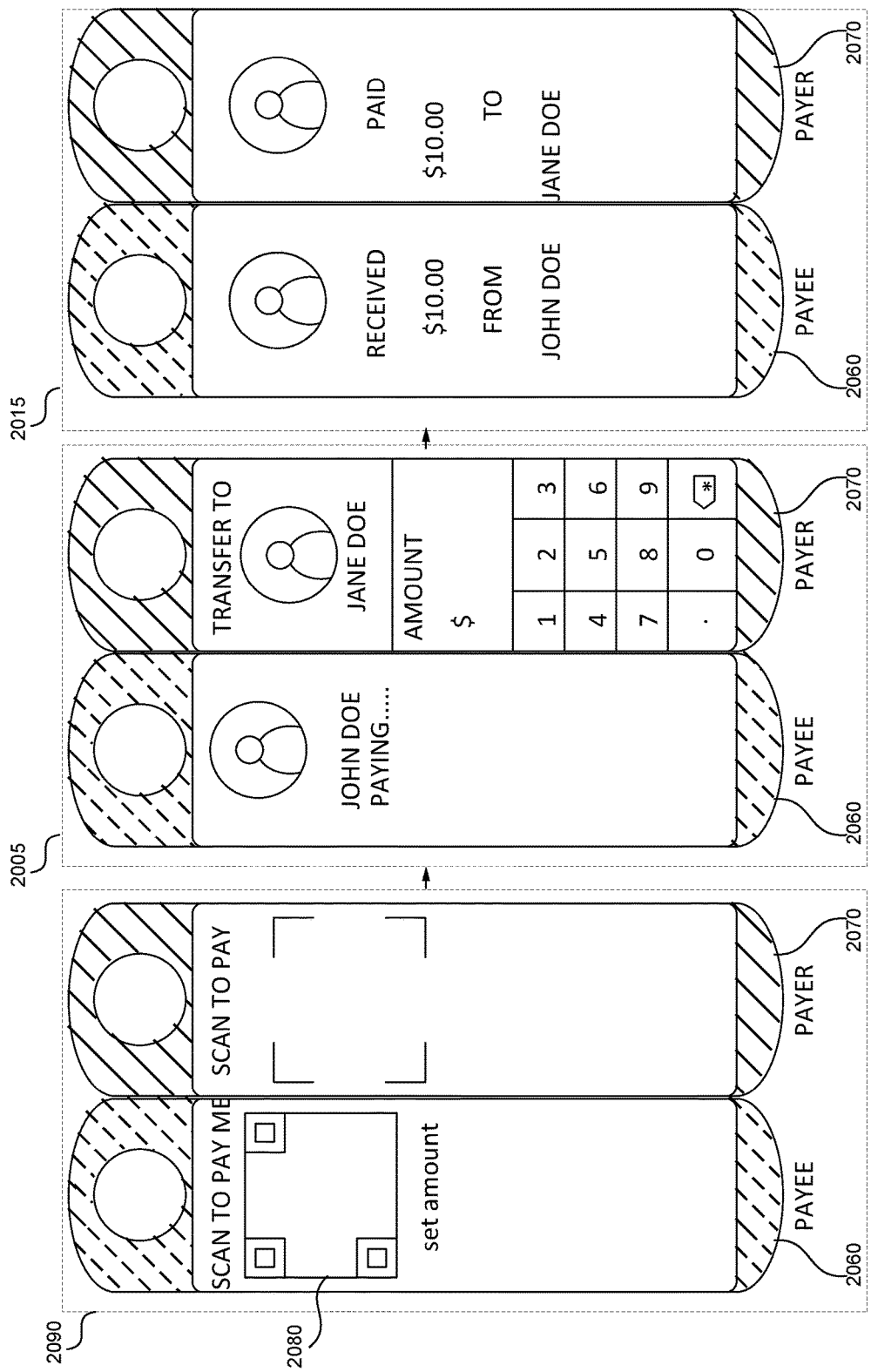
FIG. 20B shows the use of multiple handheld devices in payment by scanning.

FIG. 20B shows the use of multiple handheld devices in payment by scanning. When multiple devices 2060, 2070 are used, one device acts as payee and the other device acts as the payer. The payee device 2060 displays the QR code 2080 of an online payment account in which to deposit a payment. The QR code 2080 can also contain an amount of money to be transferred to the online payment account. The amount of money can be specified by a user associated with the payee device 2060. In step 2090, the payer device 2070 scans the QR code 2080 of the payment account. In step 2005, the payer device 2070 sends the payment to the payee device 2060. The payer device 2070 can specify an amount of money to send to the payee device 2060, or the payer device can send the full amount specified by the payee device 2060. In step 2015, the payer device 2070 and the payee device 2060 display information about the completed transaction to their respective users.

Figure 21:
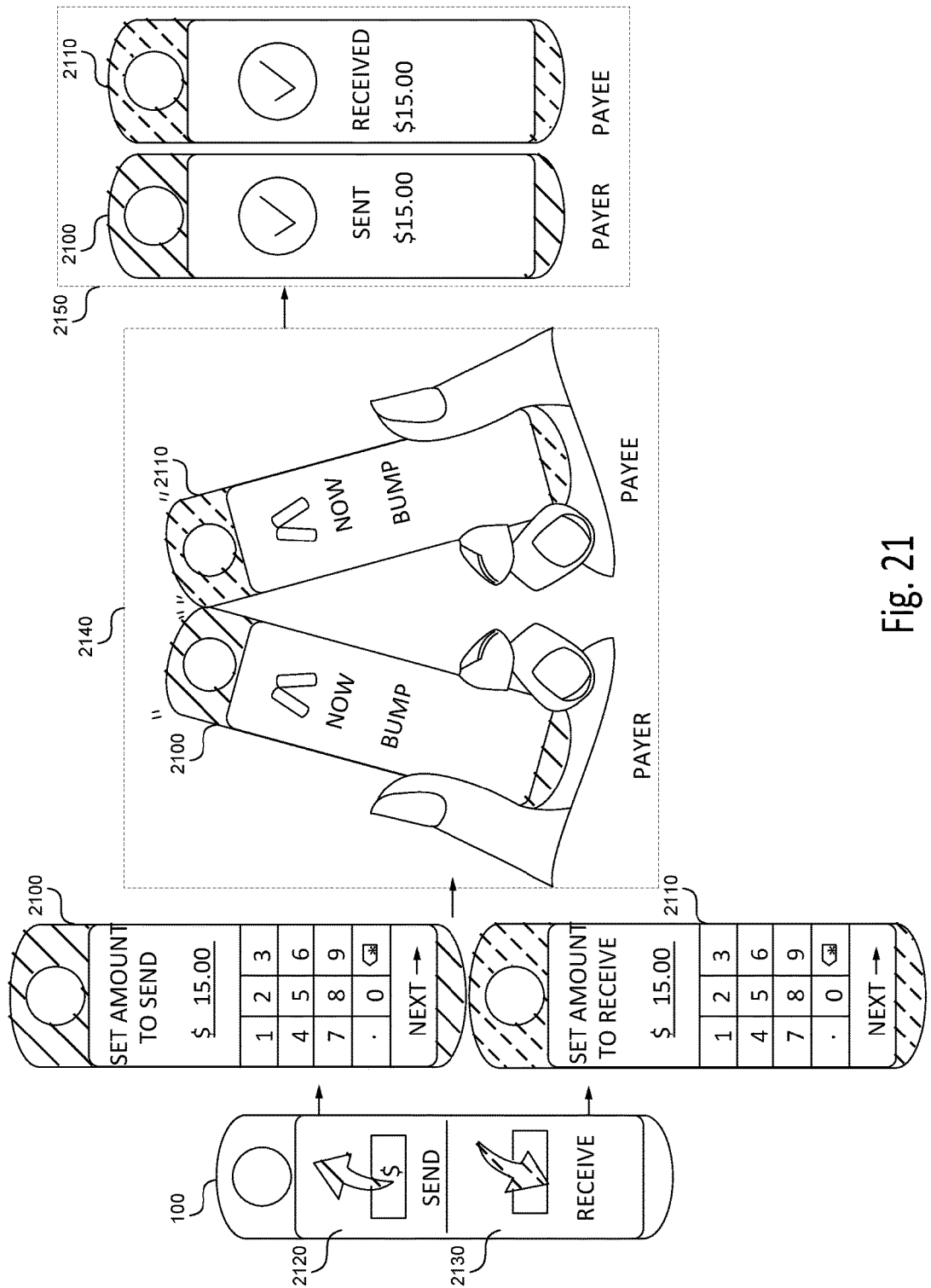
FIG. 21 shows contact payment between multiple handheld devices.

FIG. 21 shows contact payment between multiple handheld devices. The handheld device 100 can act as a payer device 2100 or a payee device 2110, upon receiving a selection of sending a payment 2120 or receiving a payment 2130, respectively. In step 2140, the payer device 2100 transfers the funds to the pay device 2110 upon establishing physical contact. The physical contact can be a touch or a bump between the payer device 2100 and the payee device 2110. In step 2150, after the completed transfer, both the payer device 2100 and the payee device 2110 display informational messages regarding the completed transaction.

Figure 22:
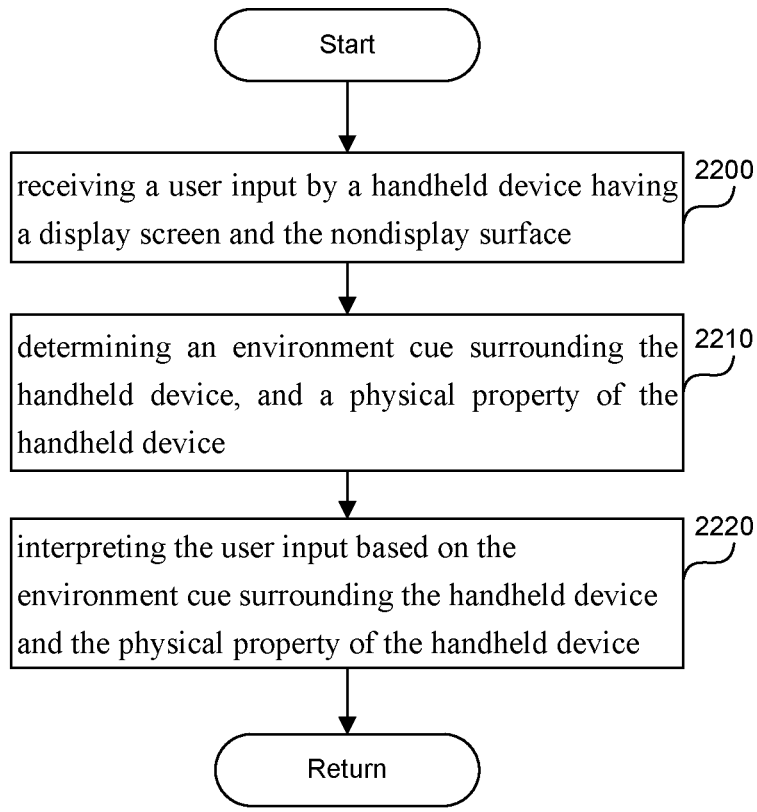
FIG. 22 is a flowchart of a method to control a handheld device having a whiteboard marker form factor.

FIG. 22 is a flowchart of a method to control a handheld device having a handheld writing implement form factor. In step 2200, a processor associated with the handheld device receives a user input. The handheld device has a display and a non-display surface and has dimensions substantially the same as dimensions of a whiteboard marker.

In step 2210, the processor determines an environment cue proximate to the handheld device and a physical property of the handheld device. The environment cue can include an object the handheld device is pointing at, proximity of other electronic communication enabled devices, an ambient light surrounding the handheld device, an ambient sound surrounding the handheld device, etc. The physical property can include at least one of a position of the handheld device, an orientation of the handheld device, an acceleration of the handheld device, a velocity of the handheld device, etc. The position of the handheld device can be measured relative to the user.

In step 2220, the processor interprets the user input based on the environment cue proximate to the handheld device and the physical property of the handheld device. The user input can be a touch input, a voice input, a gesture input. Touch input can include a press, a double press, a slide, a double slide, a pattern, etc. For example, to interpret the user input, when the amount of ambient light is above a predefined threshold, a velocity and an acceleration of the handheld device is substantially nonexistent and the user input is a touch input, the processor determines the user input as an instruction to scroll the display of the handheld device.

The processor can perform an action indicated in the interpreted user input, such as scrolling the display, taking a picture, inputting the text into the handheld device using handwriting, sending an email, making a payment, etc., as described in this application. When the handheld device has multiple cameras around the perimeter of the device, the handheld device can record multiple images through multiple normal lenses of the cameras. The lenses can be placed on top of the non-display surface of the handheld device, flush with the non-display surface, or beneath the non-display surface. Based on the multiple images, the processor can create a single 360° image.

Figure 23:
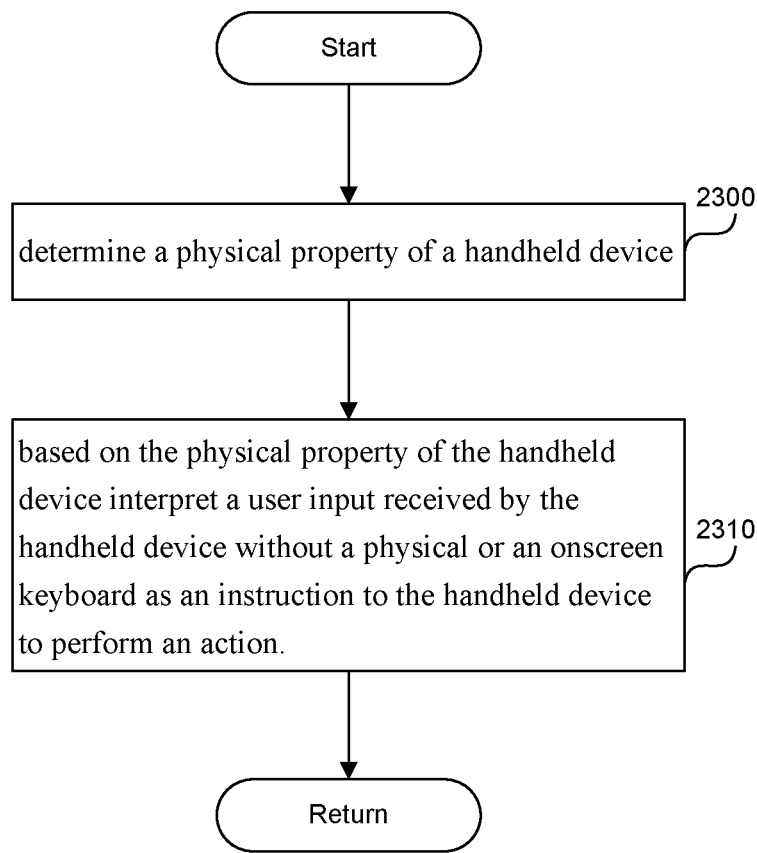
FIG. 23 is a flowchart of a method to control a handheld device without a physical or an onscreen keyboard.

FIG. 23 is a flowchart of a method to control a handheld device without a physical or an onscreen keyboard. In step 2300, a processor associated with the handheld device determines a physical property of the handheld device. The physical property can be a motion of the handheld device. In step 2310, based on the physical property of the handheld device the processor interprets a user input received by the handheld device as an instruction to the handheld device to perform an action.

In addition to determining the physical property of the device, the processor can determine an environment cue proximate to the handheld device. Based on the environment cue proximate to the handheld device and the physical property of the handheld device, the processor can interpret the user input received by the handheld device as the instruction to the handheld device to perform the action. The environment cue can be detection of smiling faces, presence of other devices enabled for electronic communication, ambient light, ambient sound, etc.

The environment cue can include a presence of an electronic communication enabled device. The physical property can include a substantially still device pointed at the electronic communication enabled device. Based on the environment cue and the physical property, the processor transmits the user input received by the handheld device as a communication to the electronic communication enabled device. For example, the electronic communication enabled device can be a household appliance such as a lamp, coffee maker, thermostat, fridge, light switch, etc. When the user moves the handheld device upward, the processor sends an instruction to the lamp to increase the brightness; conversely, when the user moves the handheld device downward, the processor sends an instruction to the lamp to decrease the brightness.

The environment cue can include a presence of the electronic communication enabled device configured to receive a payment. The motion of the handheld device includes a substantially still handheld device. The processor receives a voice input specifying an amount of money to transfer between the handheld device and the electronic communication enabled device. Based on the environment cue and the physical property, the processor interprets the user input received by the handheld device as an instruction to transmit the amount associated with the payment between the handheld device and the electronic communication enabled device. The user input can include at least one of a squeeze of the handheld device, an orientation of the handheld device, a voice authentication by the handheld device, or a fingerprint authentication by the handheld device.

The environment cue can include a presence of an electronic communication enabled device. The processor can detect a physical contact between the electronic communication enabled device and the handheld device. The processor can interpret the physical contact between the electronic communication enabled device and the handheld device as an instruction to transmit information between the electronic communication enabled device and the handheld device. The information can include at least one of a file, a business card, or a payment.

The environment cue can include a presence of a smiling face. The motion of the handheld device can include a substantially still handheld device. The processor can detect as a user input an orientation of the handheld device at a predetermined angle and interpret the orientation of the handheld device as an instruction to record an image of the smiling face using a camera associated with the handheld device.

The environment cue can include a presence of a smiling face and a presence of an electronic communication enabled device. The motion of the handheld device can include a substantially still handheld device. The processor can detect an orientation of the handheld device at a predetermined angle and interpret the orientation of the handheld device as an instruction to record an image of the smiling face using a camera associated with the handheld device. The processor can combine the image of the smiling face with an image associated with the electronic communication enabled device and transmit the combined image between the handheld device and the electronic communication enabled device. The image associated with the electronic communication enabled device can be spatially offset from the image recorded by the handheld device. Using the two offset images, the processor can create a stereoscopic image, or perform image processing effects such as blurring the background in the combined image, or in either image individually.

The motion of the handheld device can include a change in a velocity of the handheld device. The processor can receive a handwriting motion of the handheld device and interpret the handwriting motion as the instruction to input a handwritten text to into the handheld device. The handwritten text can be stored as an image on the handheld device. The processor can perform optical character recognition on the handwritten text to obtain ASCII text, and/or the processor can transform the ASCII text into a voice recording. The processor can send the handwritten text in any of the above described forms to another device using text, email, voice message, etc.

The motion of the handheld device can include a change in a velocity of the handheld device. The processor can receive a selection motion of the handheld device. The selection motion can include a substantially circular portion, such as gesture 900 and FIG. 9A, and a substantially still portion, such as gesture 910 in FIG. 9B. The processor can interpret the selection motion as an instruction to record an image during the substantially still portion. In addition, before recording the image, the processor can check whether an object circled during the substantially circular portion corresponds to the object the device is pointing at during the substantially still portion. The processor can record an image during the substantially still portion if the object circled during the substantially circular portion is the same as the object the device is pointing at during the substantially still portion.

The property of the handheld device can include a change in the velocity of the handheld device and an image shown on a display of the handheld device. The processor can receive a shake of the handheld device, such as 820 in FIG. 8A, 810 in FIG. 8B, 830 in FIG. 8C, and interpret the shake as an instruction to perform image processing on the image shown on the display screen.

Computer

Figure 24:
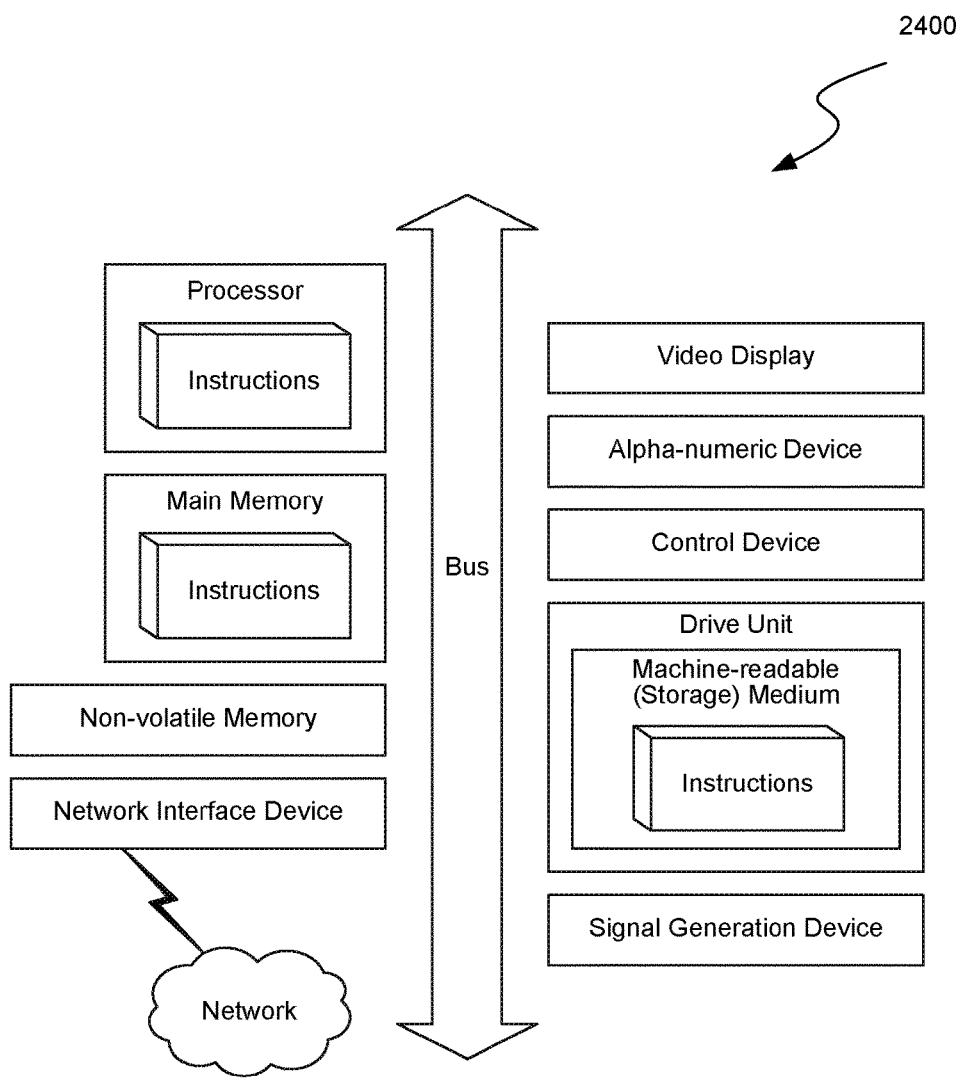
FIG. 24 is a diagrammatic representation of a machine in the example form of a computer system within which a set of instructions, for causing the machine to perform any one or more of the methodologies or modules discussed herein, may be executed.

FIG. 24 is a diagrammatic representation of a machine in the example form of a computer system 2400 within which a set of instructions, for causing the machine to perform any one or more of the methodologies or modules discussed herein, may be executed.

In the example of FIG. 24, the computer system 2400 includes a processor, memory, non-volatile memory, and an interface device. Various common components (e.g., cache memory) are omitted for illustrative simplicity. The computer system 2400 is intended to illustrate a hardware device on which any of the components described in the example of FIGS. 1-23 (and any other components described in this specification) can be implemented. The computer system 2400 can be of any applicable known or convenient type. The components of the computer system 2400 can be coupled together via a bus or through some other known or convenient device.

All, or some of the components shown in FIG. 24 can be included inside the chassis of the handheld device in FIGS. 1-23. The processor in FIG. 24 can be a processor associated with the handheld device and FIGS. 1-23, and used to interpret environment cues and user input into an instruction for the device. The video display in FIG. 24 can be the display of the handheld device in FIGS. 1-23.

This disclosure contemplates the computer system 2400 taking any suitable physical form. As example and not by way of limitation, computer system 2400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2400 may include one or more computer systems 2400; be unitary or distributed; span multiple locations; span multiple machines; or reside in a cloud, which may include one or more cloud components in one or more networks. Where appropriate, one or more computer systems 2400 may perform without substantial spatial or temporal limitation one or more steps of one or more methods described or illustrated herein. As an example and not by way of limitation, one or more computer systems 2400 may perform in real time or in batch mode one or more steps of one or more methods described or illustrated herein. One or more computer systems 2400 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 2400. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a physical keyboard or an onscreen keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 24 reside in the interface.

In operation, the computer system 2400 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
receiving a user input by a handheld device having a display, a non-display surface the handheld device formed in a shape of a handheld writing implement having an elongated dimension at least half of whose length is occupied by the display, a chassis of the handheld device opposite the display formed into a plurality of angled surfaces, the chassis of the handheld device to enable viewing of the display in an inclined position;
determining an environment cue proximate to the handheld device, and a physical property of the handheld device, the environment cue comprising an amount of ambient light proximate to the handheld device, and the physical property comprising a velocity of the handheld device and an acceleration of the handheld device; and
interpreting the user input based on the environment cue proximate to the handheld device and the physical property of the handheld device.

2. The method of claim 1, comprising:
recording a plurality of images by a plurality of normal lenses disposed around a perimeter of the handheld device and beneath the non-display surface of the handheld device; and
based on the plurality of images creating a 360° image.

3. A method comprising:
determining a physical property of a handheld device, the physical property comprising a motion of the handheld device; and
based on the physical property of the handheld device interpreting a user input received by the handheld device formed in a shape of a handheld writing implement having an elongated dimension at least half of whose length is occupied by a display as an instruction to the handheld device to perform an action, a chassis of the handheld device opposite the display formed into a plurality of angled surfaces, the chassis of the handheld device to enable viewing of the display in an inclined position.

4. The method of claim 3, comprising:
determining an environment cue proximate to the handheld device; and
based on the environment cue proximate to the handheld device and the physical property of the handheld device interpreting the user input received by the handheld device as the instruction to the handheld device to perform the action.

5. The method of claim 4, the environment cue comprising a presence of a face, the motion of the handheld device comprising a substantially still handheld device, said interpreting the user input comprising:
detecting an orientation of the handheld device at a predetermined angle; and
interpreting the orientation of the handheld device as the instruction to record an image of the face using a camera associated with the handheld device.

6. The method of claim 4, the environment cue comprising a presence of a face and a presence of an electronic communication enabled device, the motion of the handheld device comprising a substantially still handheld device, said interpreting the user input comprising:
detecting an orientation of the handheld device at a predetermined angle;
interpreting the orientation of the handheld device as the instruction to record an image of the face using a camera associated with the handheld device;
combining the image of the face with an image associated with the electronic communication enabled device.

7. The method of claim 3, the motion of the handheld device comprising a change in a velocity of the handheld device, said interpreting the user input comprising:
receiving a selection motion of the handheld device comprising a substantially circular portion and a substantially still portion; and
interpreting the selection motion as the instruction to record an image during the substantially still portion.

8. A system comprising:
a handheld device formed in a shape of a handheld writing implement having an elongated dimension at least half of whose length is occupied by a display, a chassis of the handheld device opposite the display formed into a plurality of angled surfaces, the chassis of the handheld device to enable viewing of the display in an inclined position;

a processor associated with the handheld device, the processor configured to:

determine a physical property of the handheld device, the physical property comprising a motion of the handheld device; and based on the physical property of the handheld device interpret a user input received by the handheld device as an instruction to the handheld device to perform an action.

9. The system of claim 8, the processor configured to:

determine an environment cue proximate to the handheld device; and based on the environment cue proximate to the handheld device and the physical property of the handheld device interpret the user input received by the handheld device as the instruction to the handheld device to perform the action.

10. The system of claim 9, the environment cue comprising a presence of a face and a presence of an electronic communication enabled device, the motion of the handheld device comprising a substantially still handheld device, the processor configured to:

detect an orientation of the handheld device at a predetermined angle;

interpret the orientation of the handheld device as the instruction to record an image of the face using a camera associated with the handheld device; and combine the image of the face with an image associated with the electronic communication enabled device.

11. The system of claim 9, the environment cue comprising a presence of a face, the motion of the handheld device comprising a substantially still handheld device, the processor configured to:

detect an orientation of the handheld device at a predetermined angle; and interpret the orientation of the handheld device as the instruction to record an image of the face using a camera associated with the handheld device.

12. The system of claim 8, the motion of the handheld device comprising a change in a velocity of the handheld device, the processor configured to:

receive a selection motion of the handheld device comprising a substantially circular portion and a substantially still portion; and interpret the selection motion as the instruction to record an image during the substantially still portion.

13. The system of claim 8, the physical property of the handheld device comprising a change in a velocity of the handheld device and an image shown on a display screen of the handheld device, the processor configured to:

receive a shake of the handheld device; and interpret the shake as the instruction to perform image processing on the image shown on the display screen.

* * * * *